(12) United States Patent
Foti

(10) Patent No.: US 12,273,843 B2
(45) Date of Patent: Apr. 8, 2025

(54) SUPPORT FOR IMS ROUTING WITH MULTIPLE IMS PDU SESSIONS OVER DIFFERENT 5GC SLICES

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 376 days.

(21) Appl. No.: 17/640,381

(22) PCT Filed: Aug. 28, 2020

(86) PCT No.: PCT/IB2020/058054
§ 371 (c)(1),
(2) Date: Mar. 4, 2022

(87) PCT Pub. No.: WO2021/044271
PCT Pub. Date: Mar. 11, 2021

(65) Prior Publication Data
US 2022/0338152 A1    Oct. 20, 2022

Related U.S. Application Data

(60) Provisional application No. 62/896,029, filed on Sep. 5, 2019.

(51) Int. Cl.
*H04W 60/00* (2009.01)
*H04L 65/1016* (2022.01)
(Continued)

(52) U.S. Cl.
CPC ....... *H04W 60/005* (2013.01); *H04L 65/1016* (2013.01); *H04L 65/1069* (2013.01); *H04L 65/1073* (2013.01)

(58) Field of Classification Search
CPC ............... H04W 60/005; H04W 48/18; H04L 65/1016; H04L 65/1069; H04L 65/1073; H04L 65/1046
See application file for complete search history.

(56) References Cited

U.S. PATENT DOCUMENTS

| | | | |
|---|---|---|---|
| 7,933,994 B1 * | 4/2011 | Mangal | H04L 65/1016 709/225 |
| 8,316,457 B1 | 11/2012 | Paczkowski et al. | |

(Continued)

FOREIGN PATENT DOCUMENTS

| | | |
|---|---|---|
| WO | 2019120076 A1 | 6/2019 |
| WO | 2019150245 A1 | 8/2019 |
| WO | 2020084392 A1 | 4/2020 |

OTHER PUBLICATIONS

3GPP TR 23.820, V9.0.0; Technical Specification Group Core Network and Terminals; Study on IMS Restoration Procedures. (Year : 2009).*

(Continued)

*Primary Examiner* — Asghar H Bilgrami
(74) *Attorney, Agent, or Firm* — Sonoda & Kobayashi Intellectual Property Law; Sarvajit S. Patil

(57) ABSTRACT

Systems and methods are disclosed herein that relate to supporting Internet Protocol (IP) Multimedia Subsystem (IMS) routing with multiple IMS Protocol Data Unit (PDU) sessions over different core network slices. In one embodiment, a method comprises, at an Interrogating Call Session Control Function (I-CSCF), receiving a Session Initiation Protocol (SIP) invite message for an incoming session, where the SIP invite message comprises an IP Multimedia Public Identity (IMPU) of a target User Equipment (UE). The method further comprises, at the I-CSCF, sending, to a Home Subscriber Server (HSS), a query for Serving Call Session Control Functions (S-CSCFs) having registrations (Continued)

for the IMPU of the target UE and receiving, from the HSS, information that indicates two or more S-CSCFs having registrations for the IMPU of the target UE. The method further comprises, at the I-CSCF, forwarding the SIP invite message to at least one of the two or more S-CSCFs.

5 Claims, 15 Drawing Sheets

(51) Int. Cl.
*H04L 65/1046* (2022.01)
*H04L 65/1069* (2022.01)
*H04L 65/1073* (2022.01)
*H04W 48/18* (2009.01)

(56) References Cited

U.S. PATENT DOCUMENTS

| | | | |
|---|---|---|---|
| 9,584,559 B2* | 2/2017 | Noldus | H04L 65/1069 |
| 2007/0008913 A1 | 1/2007 | Naqvi et al. | |
| 2007/0088836 A1 | 4/2007 | Tai et al. | |
| 2009/0093249 A1 | 4/2009 | Zhu et al. | |
| 2010/0150137 A1* | 6/2010 | Lu | H04L 65/1016 370/352 |
| 2010/0217875 A1* | 8/2010 | Belinchon | H04L 65/1104 709/228 |
| 2010/0257272 A1 | 10/2010 | Vergara et al. | |
| 2011/0273986 A1* | 11/2011 | Le Rouzic | H04L 65/1016 370/235 |
| 2012/0036270 A1 | 2/2012 | Escribano Bullon et al. | |
| 2013/0250942 A1 | 9/2013 | Khan et al. | |
| 2015/0016448 A1* | 1/2015 | Noldus | H04L 65/1063 370/352 |
| 2015/0195864 A1 | 7/2015 | Rodrigo et al. | |
| 2016/0248814 A1 | 8/2016 | Mufti et al. | |
| 2017/0085455 A1* | 3/2017 | Chiang | H04L 65/1073 |
| 2018/0007612 A1 | 1/2018 | Jahangir et al. | |
| 2019/0021043 A1 | 1/2019 | Youn et al. | |
| 2019/0223093 A1 | 7/2019 | Watfa et al. | |
| 2019/0288988 A1 | 9/2019 | Noldus | |
| 2019/0327136 A1* | 10/2019 | Chatras | H04L 65/1073 |
| 2020/0137675 A1 | 4/2020 | Park et al. | |
| 2020/0169951 A1 | 5/2020 | Cai et al. | |
| 2021/0021647 A1 | 1/2021 | Cai et al. | |

OTHER PUBLICATIONS

China Mobile: "FS_enIMS TR22.823: Use case on network slicing of IMS independent to 5GC slice". Mar. 2019 (Year: 2019).*
3GPP TR 23.794 v1.0.0 (Mar. 2019): Technical Specification Group; Services and System Aspects; Study on Enhanced IMS to 5GC Integration (Release 16) (Year: 2019).*
Non-Final Office Action for U.S. Appl. No. 16/965,712, mailed Sep. 2, 2021, 16 pages.
Author Unknown, "Technical Specification Group Core Network and Terminals; IP Multimedia (IM) session handling; IM call model; Stage 2 (Release 15)," Technical Specification 23.218, Version 15.0.0, 3GPP Organizational Partners, Jun. 2018, 73 pages.
Author Unknown, "Technical Specification Group Services and System Aspects; IP Multimedia Subsystem (IMS); Stage 2 (Release 15)," Technical Specification 23.228, Version 15.1.0, 3GPP Organizational Partners, Dec. 2017, 329 pages.
Author Unknown, "Technical Specification Group Services and System Aspects; System Architecture for the 5G System; Stage 2 (Release 15)," Technical Specification 23.501, Version 15.0.0, 3GPP Organizational Partners, Dec. 2017, 181 pages.
Author Unknown, "Technical Specification Group Services and System Aspects; Procedures for the 5G System; Stage 2 (Release 15)," Technical Specification 23.502, Version 15.0.0, 3GPP Organizational Partners, Dec. 2017, 258 pages.
Author Unknown, "Technical Specification Group Services and System Aspects; Study on Enhanced IMS to 5GC Integration (Release 16)," Technical Report 23.794, Version 1.0.0, Mar. 2019, 3GPP Organizational Partners, 83 pages.
Author Unknown, "Technical Specification Group Core Network and Terminals; Study on IMS Restoration Procedures (Release 9)," Technical Report 23.820, Version 9.0.0, Sep. 2009, 3GPP Organizational Partners, 43 pages.
Author Unknown, "Technical Specification Group Core Network and Terminals; IP Multimedia call control protocol based on Session Initiation Protocol (SIP) and Session Description Protocol (SDP); Stage 3 (Release 15)," Technical Specification 24.229, Version 15.1.0, 3GPP Organizational Partners, Dec. 2017, 999 pages.
China Mobile, "S1-174518: FS_enIMS TR22.823: Use case on network slicing of IMS independent to 5GC slice," Third Generation Partnership Project (3GPP), TSG-SA WG1 Meeting #80, Nov. 27-Dec. 1, 2017, 3 pages, Reno, NV.
China Mobile, "S2-180714: key issue of P-CSCF discovery for UE accessing to multiple IMS network via a network slice," Third Generation Partnership Project (3GPP), SA WG2 Meeting #125, Jan. 22-26, 2018, 1 page, Gothenburg, Sweden.
China Mobile, "S5-197283: Add attribute properties for network slice supports IMS and SSC mode," Third Generation Partnership Project (3GPP), TSG-SA5 Meeting #128, Nov. 18-22, 2019, Zhuhai, China, 6 pages.
Huawei, et al., "S2-182176: Solution for Network Slicing and IMS Scenario 2," Third Generation Partnership Project (3GPP), SA WG2 Meeting #126, Feb. 26-Mar. 2, 2018, 4 pages, Montreal, Canada.
T-Mobile USA Inc, "S2-172029: Network Slicing and IMS Interactions," Third Generation Partnership Project (3GPP), SA WG2 Meeting #120, Mar. 27-31, 2017, 3 pages, Busan, South Korea.
Examination Report for European Patent Application No. 19709776.9, mailed Jul. 12, 2021, 3 pages.
International Search Report and Written Opinion for International Patent Application No. PCT/IB2019/050682, mailed Apr. 12, 2019, 16 pages.
International Search Report and Written Opinion for International Patent Application No. PCT/IB2019/058785, mailed Jan. 3, 2020, 17 pages.
Invitation to Pay Fees and Partial Search for International Patent Application No. PCT/IB2020/058054, mailed Nov. 20, 2020, 22 pages.
International Search Report and Written Opinion for International Patent Application No. PCT/IB2020/058054, mailed Jan. 18, 2021, 26 pages.
Author Unknown, "Technical Specification Group Services and System Aspects; Study on Enhanced IMS to 5GC Integration (Release 16)," Technical Report 23.794, Version 0.4.0, Jun. 2018, 3GPP Organizational Partners, 65 pages.
Non-Final Office Action for U.S. Appl. No. 17/288,625, mailed May 20, 2022, 18 pages.
First Office Action for Chinese Patent Application No. 202080062502.0, mailed Aug. 17, 2023, 23 pages.
Examination Report for European Patent Application No. 20768390.5, mailed Mar. 24, 2023, 11 pages.

* cited by examiner

SUPPORT FOR IMS ROUTING WITH MULTIPLE IMS PDU SESSIONS OVER DIFFERENT 5GC SLICES

RELATED APPLICATIONS

This application is a 35 U.S.C. § 371 national phase filing of International Application No. PCT/IB2020/058054, filed Aug. 28, 2020, which claims the benefit of provisional patent application Ser. No. 62/896,029, filed Sep. 5, 2019, the disclosures of which are hereby incorporated herein by reference in their entireties.

TECHNICAL FIELD

The present disclosure relates to network slicing and, in the preferred embodiments described herein, network slicing in a Third Generation Partnership Project (3GPP) Fifth Generation (5G) Core network (5GC), which is sometimes referred to as 5GC slicing.

BACKGROUND

Network slicing utilizes virtualization technology (e.g., Software Defined Networking (SDN) and Network Functions Virtualization (NFV)) to allow multiple virtual (i.e., logical) networks to be created on top of a common shared physical infrastructure. These virtual networks are referred to as network slices. The network slices can then be customized to meet needs of different use cases.

Network slicing has been proposed in the Third Generation Partnership Project (3GPP) for the Fifth Generation System (5GS). Further, the concept of Internet Protocol (IP) Multimedia Subsystem (IMS) slicing has been proposed in Patent Cooperation Treaty (PCT) Patent Application Publication No. WO 2019/150245 A1, entitled NETWORK SLICING IN IMS. When using network slicing in the 5GS and IMS slicing, a single User Equipment (UE) may having two or more IMS registrations using the same IMPI/IMPU using two or more respective IMS Protocol Data Unit (PDU) sessions over two or more respective network slices in the 5GS. While this has great benefits, it also creates new challenges that need to be addressed within the 5GS and IMS.

SUMMARY

Systems and methods are disclosed herein that relate to supporting Internet Protocol (IP) Multimedia Subsystem (IMS) routing with multiple IMS Protocol Data Unit (PDU) sessions over different core network slices. In one embodiment, a method comprises, at an Interrogating Call Session Control Function (I-CSCF) of an IMS, receiving a Session Initiation Protocol (SIP) invite message for an incoming session, where the SIP invite message comprises an IP Multimedia Public Identity (IMPU) of a target User Equipment (UE). The method further comprises, at the I-CSCF, sending, to a Home Subscriber Server (HSS), a query for Serving Call Session Control Functions (S-CSCFs) having registrations for the IMPU of the target UE and receiving, from the HSS, information that indicates two or more S-CSCFs having registrations for the IMPU of the target UE. The method further comprises, at the I-CSCF, forwarding the SIP invite message to at least one of the two or more S-CSCFs. The method further comprises, at the HSS, receiving the query from the I-CSCF, obtaining the information that indicates the two or more S-CSCFs having registrations for the IMPU of the target UE, and sending, to the I-CSCF, the information that indicates the two or more S-CSCFs having registrations for the IMPU of the target UE. The method further comprises, at each S-CSCF of the at least one of the two or more S-CSCFs, receiving the SIP invite message from the I-CSCF, determining whether to accept the incoming session based on the SIP invite message, and sending a message to the I-CSCF that indicates an error or rejection if determined to reject the incoming session and forwarding the SIP invite message to another node and if determined to accept the incoming session. This provides a way of allowing an IMS user to establish multiple PDU sessions for different purposes and allowing different S-CSCFs to be used for supporting these services using the same identity (IMPU) while ensuring proper routing for terminating sessions.

In one embodiment, the method further comprises, at the I-CSCF, selecting a first S-CSCF from among the two or more S-CSCFs, and forwarding the SIP invite message to the at least one of the two or more S-CSCFs comprises forwarding the SIP invite message to the first S-CSCF. In one embodiment, the method further comprises, at the I-CSCF, receiving a message from the first S-CSCF that indicates an error or rejection of the incoming session and, upon receiving the message from the first S-CSCF that indicates an error or rejection of the incoming session, selecting a second S-CSCF from among the two or more S-CSCFs and forwarding the SIP invite message to the second S-CSCF.

In one embodiment, forwarding the SIP invite message to the at least one of the two or more S-CSCFs comprises forwarding the SIP invite message to each of the two or more S-CSCFs.

In one embodiment, at each S-CSCF of the at least one of the two or more S-CSCFs, determining whether to accept the incoming session based on the SIP invite message comprises determining whether there is a match between a requested service of the SIP invite message and contact information for the target UE. The contact information for the target UE comprises information that indicates one or more services that the target UE supports obtained during IMS registration of the target UE with an IMS slice associated to the S-CSCF.

In one embodiment, the target UE has two or more IMS registrations over two or more IMS PDU sessions established using different core network slices using a same IP Multimedia Private Identity (IMPI) and IMPU, and each of the two or more IMS registrations is associated to one of the two or more S-CSCFs.

Corresponding embodiments of a system are also disclosed. In one embodiment, a system comprises an I-CSCF adapted to receive a SIP invite message for an incoming session, where the SIP invite message comprises an IMPU of a target UE. The I-CSCF is further adapted to send, to a HSS, a query for S-CSCFs having registrations for the IMPU of the target UE and receive, from the HSS, information that indicates two or more S-CSCFs having registrations for the IMPU of the target UE. The I-CSCF is further adapted to forward the SIP invite message to at least one of the two or more S-CSCFs. The system further comprises the HSS, where the HSS is adapted to receive the query from the I-CSCF, obtain the information that indicates the two or more S-CSCFs having registrations for the IMPU of the target UE, and send, to the I-CSCF, the information that indicates the two or more S-CSCFs having registrations for the IMPU of the target UE. Each S-CSCF of the at least one of the two or more S-CSCFs is adapted to receive the SIP invite message from the I-CSCF, determine whether to accept the incoming session based on the SIP invite message, and send a message to the I-CSCF that indicates an error or rejection if determined to reject the incoming session and forward the SIP invite message to another node and if determined to accept the incoming session.

Embodiments of a method performed by an I-CSCF for an IMS are also disclosed. In one embodiment, a method performed by an I-CSCF comprises receiving a SIP invite message for an incoming session, where the SIP invite message comprises an IMPU of a target. The method further comprises obtaining, based on the IMPU, information that indicates two or more S-CSCFs having registrations for the IMPU of the target UE and forwarding the SIP invite message to at least one of the two or more S-CSCFs.

In one embodiment, the method further comprises selecting a first S-CSCF from among the two or more S-CSCFs, and wherein forwarding the SIP invite message to the at least one of the two or more S-CSCFs comprises forwarding the SIP invite message to the first S-CSCF. In one embodiment, the method further comprises receiving a message from the first S-CSCF that indicates an error or rejection of the incoming session and, upon receiving the message from the first S-CSCF that indicates an error or rejection of the incoming session, selecting a second S-CSCF from among the two or more S-CSCFs and forwarding the SIP invite message to the second S-CSCF.

In one embodiment, forwarding the SIP invite message to the at least one of the two or more S-CSCFs comprises forwarding the SIP invite message to each of the two or more S-CSCFs.

In one embodiment, the target UE has two or more IMS registrations over two or more IMS PDU sessions established using different core network slices using a same IMPI and IMPU, and each of the two or more IMS registrations is associated to one of the two or more S-CSCFs.

Corresponding embodiments of an I-CSCF for an IMS are also disclosed. In one embodiment, an I-CSCF is adapted to receive a SIP invite message for an incoming session, where the SIP invite message comprises an IMPU of a target UE. The I-CSCF is further adapted to obtain, based on the IMPU, information that indicates two or more S-CSCFs having registrations for the IMPU of the target UE and forward the SIP invite message to at least one of the two or more S-CSCFs.

Corresponding embodiments of an IMS physical infrastructure node that implements an I-CSCF for an IMS are also disclosed. In one embodiment, the IMS physical infrastructure node comprises a network interface and processing circuitry associated with the network interface. The processing circuitry is configured to cause the IMS physical infrastructure node to receive a SIP invite message for an incoming session, where the SIP invite message comprises an IMPU of a target UE. The processing circuitry is further configured to cause the IMS physical infrastructure node to obtain, based on the IMPU, information that indicates two or more S-CSCFs having registrations for the IMPU of the target UE and forward the SIP invite message to at least one of the two or more S-CSCFs.

Embodiments of a method performed by an HSS for an IMS are also disclosed. In one embodiment, a method performed by an HSS comprises receiving a query from an I-CSCF, wherein the query is for S-CSCFs having registrations for an IMPU of a target UE. The method further comprises obtaining information that indicates two or more S-CSCFs having registrations for the IMPU of the target UE and sending, to the I-CSCF, the information that indicates the two or more S-CSCFs having registrations for the IMPU of the target UE.

In one embodiment, the target UE has two or more IMS registrations over two or more IMS PDU sessions established using different core network slices using a same IMPI and IMPU, and each of the two or more IMS registrations is associated to one of the two or more S-CSCFs.

Corresponding embodiments of a HSS are also disclosed. In one embodiment, an HSS for an IMS is adapted to receive a query from an I-CSCF, wherein the query is for S-CSCFs having registrations for an IMPU of a target UE. The HSS is further adapted to obtain information that indicates two or more S-CSCFs having registrations for the IMPU of the target UE and send, to the I-CSCF, the information that indicates the two or more S-CSCFs having registrations for the IMPU of the target UE.

Corresponding embodiments of an IMS physical infrastructure node implementing an HSS are also disclosed. In one embodiment, a physical infrastructure node implementing an HSS comprises a network interface and processing circuitry associated with the network interface. The processing circuitry is configured to cause the IMS physical infrastructure node to receive a query from an I-CSCF, wherein the query is for S-CSCFs having registrations for an IMPU of a target UE. The processing circuitry is further configured to cause the IMS physical infrastructure node to obtain information that indicates two or more S-CSCFs having registrations for the IMPU of the target UE and send, to the I-CSCF, the information that indicates the two or more S-CSCFs having registrations for the IMPU of the target UE.

Embodiments of a method performed by an S-CSCF for an IMS are also disclosed. In one embodiment, method performed by an S-CSCF comprises receiving, from an I-CSCF, a SIP invite message for an incoming session for a target UE. The method further comprises determining whether to accept the incoming session based on the SIP invite message, sending a message to the I-CSCF that indicates an error or rejection if determined to reject the incoming session, and forwarding the SIP invite message to another node if determined to accept the incoming session.

In one embodiment, determining whether to accept the incoming session based on the SIP invite message comprises determining whether there is a match between a requested service of the SIP invite message and contact information for the target UE. The contact information for the target UE comprising information that indicates one or more services that the target UE supports obtained during IMS registration of the target UE with an IMS slice associated to the S-CSCF.

In one embodiment, the other node is a Proxy Call Session Control Function, P-CSCF.

In one embodiment, the target UE has two or more IMS registrations over two or more IMS PDU sessions established using different core network slices using a same IMPI and IMPU, and each of the two or more IMS registrations is associated to one of two or more S-CSCFs.

Corresponding embodiments of an S-CSCF are also disclosed. In one embodiment, an S-CSCF for an IMS is adapted to receive, from an I-CSCF, a SIP invite message for an incoming session for a target UE. The S-CSCF is further adapted to determine whether to accept the incoming session based on the SIP invite message, send a message to the I-CSCF that indicates an error or rejection if determined to reject the incoming session, and forward the SIP invite message to another node if determined to accept the incoming session.

Embodiments of an IMS physical infrastructure node that implements an S-CSCF are also disclosed. In one embodiment, an IMS physical infrastructure node that implements an S-CSCF for an IMS comprises a network interface and processing circuitry associated with the network interface. The processing circuitry is configured to cause the IMS physical infrastructure node to receive, from an I-CSCF, a SIP invite message for an incoming session for a target UE. The processing circuitry is further configured to cause the IMS physical infrastructure node to determine whether to accept the incoming session based on the SIP invite message, send a message to the I-CSCF that indicates an error or rejection if determined to reject the incoming session, and forward the SIP invite message to another node if determined to accept the incoming session.

In another embodiment, a method comprises, at a P-CSCF, receiving a SIP register message from a UE, wherein the SIP register message comprises information that indicates a core network slice for which an IMS registration is being performed. The method further comprises, at the P-CSCF, storing information that indicates the core network slice in association with contact information for the UE and forwarding the SIP register message to a S-CSCF. The method further comprises, at the S-CSCF, receiving the SIP register message, storing information that indicates the core network slice in association with the contact information for the UE, and forwarding the SIP register message to a HSS. The method further comprises, at the HSS, receiving the SIP register message, storing information that indicates the core network slice in association with the contact information for the UE, registration status, and a registration record for the IMS registration for the UE, and sending a SIP OK message to be forwarded to the UE.

In one embodiment, the UE has two or more IMS registrations over two or more IMS PDU sessions established using different core network slices using a same IMPI and IMPU, and each of the two or more IMS registrations is associated to one of two or more S-CSCFs.

Embodiments of a method performed by a Call Session Control Function (CSCF) for an IMS are also disclosed. In one embodiment, a method performed by a CSCF for an IMS comprises receiving a SIP register message that originated from a UE, wherein the SIP register message comprises information that indicates a core network slice for which an IMS registration is being performed. The method further comprises storing information that indicates the core network slice in association with contact information for the UE and forwarding the SIP register message to another IMS node.

In one embodiment, the CSCF is an P-CSCF, and the other IMS node to which the SIP register message is forwarded is a S-CSCF.

In one embodiment, the CSCF is a S-CSCF, receiving the SIP register message comprises receiving the SIP register message from a P-CSCF, and the other IMS node to which the SIP register message is forwarded is a HSS.

In one embodiment, the UE has two or more IMS registrations over two or more IMS PDU sessions established using different core network slices using a same IMPI and IMPU, and each of the two or more IMS registrations is associated to one of two or more S-CSCFs.

Corresponding embodiments of a CSCF for an IMS are also disclosed. In one embodiment, a CSCF for an IMS is adapted to receive a SIP register message that originated from a UE, wherein the SIP register message comprises information that indicates a core network slice for which an IMS registration is being performed. The CSCF is further adapted to store information that indicates the core network slice in association with contact information for the UE and forward the SIP register message to another IMS node.

Corresponding embodiments of an IMS physical infrastructure node that implements a CSCF are also disclosed. In one embodiment, an IMS physical infrastructure node for an IMS comprises a network interface and processing circuitry associated with the network interface. The processing circuitry is configured to cause the IMS physical infrastructure node to receive a SIP register message that originated from a UE, wherein the SIP register message comprises information that indicates a core network slice for which an IMS registration is being performed. The processing circuitry is further configured to cause the IMS physical infrastructure node to store information that indicates the core network slice in association with contact information for the UE and forward the SIP register message to another IMS node.

Embodiments of a method performed by an HSS for an IMS are also disclosed. In one embodiment, a method performed by an HSS for an IMS comprises receiving a SIP register message that originated from a UE, wherein the SIP register message comprises information that indicates a core network slice for which an IMS registration is being performed. The method further comprises storing information that indicates the core network slice in association with the contact information for the UE, registration status and a registration record for a respective IMS registration for the UE, and sending a SIP OK message to be forwarded to the UE.

In one embodiment, the UE has two or more IMS registrations over two or more IMS PDU sessions established using different core network slices using a same IMPI and IMPU, and each of the two or more IMS registrations is associated to one of two or more S-CSCFs.

Corresponding embodiments of an HSS for an IMS are also disclosed. In one embodiment, an HSS for an IMS is adapted to receive a SIP register message that originated from a UE, wherein the SIP register message comprises information that indicates a core network slice for which an IMS registration is being performed. The HSS is further adapted to store information that indicates the core network slice in association with the contact information for the UE, registration status and a registration record for a respective IMS registration for the UE, and send a SIP OK message to be forwarded to the UE.

Corresponding embodiments of an IMS physical infrastructure node that implements an HSS for an IMS are also disclosed. In one embodiment, an IMS physical infrastructure node that implements an HSS for an IMS comprises a network interface and processing circuitry associated with the network interface. The processing circuitry is configured to cause the IMS physical infrastructure node to receive a SIP register message that originated from a UE, wherein the SIP register message comprises information that indicates a core network slice for which an IMS registration is being performed. The processing circuitry is further configured to cause the IMS physical infrastructure node to store information that indicates the core network slice in association with the contact information for the UE, registration status and a registration record for a respective IMS registration for the UE, and send a SIP OK message to be forwarded to the UE.

In another embodiment, a method comprises, at a P-CSCF, receiving a SIP register message from a UE and forwarding the SIP register message to a S-CSCF. The method further comprises, at the S-CSCF, receiving the SIP register message and forwarding the SIP register message to a HSS. The method further comprises, at the HSS, receiving the SIP register message, locating a corresponding subscriber record for the SIP register message, obtaining a corresponding Subscriber Permanent Identifier (SUPI) for the UE, obtaining a PDU session associated with contact information stored for the UE, determining a core network slice used for the PDU session, storing information that indicates the core network slice in association with the contact information stored for the UE and a registration record for the IMS registration for the UE, and sending a SIP OK message to the S-CSCF, where the SIP OK message comprises information that indicates the core network slice. The method further comprises, at the S-CSCF, receiving the SIP OK message, storing the information that indicates the core network slice comprised in the SIP OK message, and forwarding the SIP OK message to the P-CSCF. The method further comprises, at the P-CSCF, receiving the SIP OK message, storing the information that indicates the core network slice comprised in the SIP OK message, and forwarding the SIP OK message towards the UE.

In one embodiment, the UE has two or more IMS registrations over two or more IMS PDU sessions established using different core network slices using a same IMPI and IMPU, and each of the two or more IMS registrations is associated to one of two or more S-CSCFs.

Embodiments of a method performed by a CSCF for an IMS are also disclosed. In one embodiment, a method performed by a CSCF for an IMS comprises receiving a SIP register message from a UE and forwarding the SIP register message to another IMS node. The method further comprises receiving, from the other IMS node, a SIP OK message responsive to the SIP register message, where the SIP OK message comprises information that indicates a core network slice used for an IMS session associated to a respective IMS registration of the UE. The method further comprises storing information that indicates the core network slice and forwarding the SIP OK message towards the UE.

In one embodiment, the CSCF is a P-CSCF, and the other IMS node to which the SIP register message is forwarded and from which the SIP OK message is received is a S-CSCF.

In one embodiment, the CSCF is a S-CSCF, and receiving the SIP register message comprises receiving the SIP register message from a P-CSCF. The other IMS node to which the SIP register message is forwarded and from which the SIP OK message is received is a HSS.

In one embodiment, the UE has two or more IMS registrations over two or more IMS PDU sessions established using different core network slices using a same IMPI and IMPU, and each of the two or more IMS registrations is associated to one of two or more S-CSCFs.

Corresponding embodiments of a CSCF for an IMS are also disclosed. In one embodiment, a CSCF for an IMS is adapted to receive a SIP register message from a UE and forward the SIP register message to another IMS node. The CSCF is further adapted to receive, from the other IMS node, a SIP OK message responsive to the SIP register message, where the SIP OK message comprises information that indicates a core network slice used for an IMS session associated to a respective IMS registration of the UE. The CSCF is further adapted to store information that indicates the core network slice and forward the SIP OK message towards the UE.

Corresponding embodiments of an IMS physical infrastructure node that implements a CSCF are also disclosed. In one embodiment, an IMS physical infrastructure node that implements a CSCF for an IMS comprises a network interface and processing circuitry associated with the network interface. The processing circuitry is configured to cause the IMS physical infrastructure node to receive a SIP register message from a UE and forward the SIP register message to another IMS node. The processing circuitry is further configured to cause the IMS physical infrastructure node to receive, from the other IMS node, a SIP OK message responsive to the SIP register message, where the SIP OK message comprises information that indicates a core network slice used for an IMS session associated to a respective IMS registration of the UE. The processing circuitry is further configured to cause the IMS physical infrastructure node to store information that indicates the core network slice and forward the SIP OK message towards the UE.

Embodiments of a method performed by a HSS of an IMS are also disclosed. In one embodiment, a method performed by an HSS of an IMS comprises receiving, from a S-CSCF, a SIP register message for a UE, locating a corresponding subscriber record for the SIP register message, obtaining a corresponding SUPI for the UE, obtaining a PDU session associated with contact information stored for the UE, determining a core network slice used for the PDU session, storing information that indicates the core network slice in association with the contact information stored for the UE, registration status, and a registration record for an IMS registration for the UE, and sending a SIP OK message to the S-CSCF, where the SIP OK message comprises information that indicates the core network slice.

In one embodiment, the UE has two or more IMS registrations over two or more IMS PDU sessions established using different core network slices using a same IMPI and IMPU, and each of the two or more IMS registrations is associated to one of two or more S-CSCFs.

Corresponding embodiments of an HSS for an IMS are also disclosed. In one embodiment, an HSS for an IMS is adapted to receive, from a S-CSCF, a SIP register message for a UE, locate a corresponding subscriber record for the SIP register message, obtain a corresponding SUPI for the UE, obtain a PDU session associated with contact information stored for the UE, determine a core network slice used for the PDU session, store information that indicates the core network slice in association with the contact information stored for the UE, registration status, and a registration record for an IMS registration for the UE, and send a SIP OK message to the S-CSCF, where the SIP OK message comprises information that indicates the core network slice.

Corresponding embodiments of an IMS physical infrastructure node that implements an HSS for an IMS are also disclosed. In one embodiment, an IMS physical infrastructure node that implements an HSS for an IMS comprises a network interface and processing circuitry associated with the network interface. The processing circuitry is configured to cause the IMS physical infrastructure node to receive, from a S-CSCF, a SIP register message for a UE, locate a corresponding subscriber record for the SIP register message, obtain a corresponding SUPI for the UE, obtain a PDU session associated with contact information stored for the UE, determine a core network slice used for the PDU session, store information that indicates the core network slice in association with the contact information stored for the UE, registration status, and a registration record for an IMS registration for the UE, and send a SIP OK message to the S-CSCF, where the SIP OK message comprises information that indicates the core network slice.

Embodiments of a method performed in an IMS for processing a SIP invite message are also disclosed. In one embodiment, a method performed in an IMS comprises, at a HSS, for each of two or more IMS registrations of a UE for a same IMPI/IMPU for IMS PDU sessions over two or more respective core network slices, storing information that indicates a core network slice used for an IMS PDU session of the UE associated to an IMS registration. The method further comprises, at an I-CSCF, receiving a SIP invite message comprising the IMPU of the UE and sending, to the HSS, a query comprising the IMPU of the UE. The method further comprises, at the HSS, receiving the query from the I-CSCF and determining a S-CSCF associated to the IMPU of the UE and one of the two or more respective core network slices. The one of the two or more respective core network slices is either: a core network slice indicated in the SIP invite message and the query, a core network slice that is assumed by the HSS to be a correct core network slice for the SIP invite message, or a core network slice associated to a IMS PDU session associated to the SIP invite message. The method further comprises, at the HSS, sending, to the I-CSCF, information that indicates the determined S-CSCF. The method further comprises, at the I-CSCF, receiving the information that indicates the determined S-CSCF from the HSS and forwarding the SIP invite message to the determined S-CSCF.

In one embodiment, the SIP invite message comprises information that indicates the core network slice, the query sent from the I-CSCF to the HSS comprises information that indicates the core network slice, and the one of the two or more respective core network slices is the core network slice indicated by the information comprised in the SIP invite message and the query. In another embodiment, the one of the two or more respective core network slices is the core network slice that is assumed by the HSS to be the correct core network slice for the SIP invite message. In one embodiment, the SIP invite message is received from another IMS.

In one embodiment, the one of the two or more respective core network slices is the core network slice associated to the IMS PDU session associated to the SIP invite message. In one embodiment, the SIP invite message is received from another IMS node in the IMS.

Embodiments of a method performed by an HSS in association with processing of a SIP invite message are also disclosed. In one embodiment, a method performed by an HSS for an IMS comprises, for each of two or more IMS registrations of a UE for a same IMPI/IMPU for IMS PDU sessions over two or more respective core network slices, storing information that indicates a core network slice used for an IMS PDU session of the UE associated to the IMS registration. The method further comprises receiving, from an I-CSCF, a query comprising an IMPU of the UE from a SIP invite message and determining a S-CSCF associated to the IMPU of the UE and one of the two or more respective core network slices. The one of the two or more respective core network slices is either: a core network slice indicated in the SIP invite message and the query, a core network slice that is assumed by the HSS to be a correct core network slice for the SIP invite message, or a core network slice associated to a PDU session associated to the SIP invite message. The method further comprises sending, to the I-CSCF, information that indicates the determined S-CSCF.

In one embodiment, the query sent from the I-CSCF to the HSS comprises information that indicates the core network slice indicated in the SIP invite message, and the one of the two or more respective core network slices is the core network slice indicated by the information comprised in the SIP invite message and the query.

In one embodiment, the one of the two or more respective core network slices is the core network slice that is assumed by the HSS to be the correct core network slice for the SIP invite message.

In one embodiment, the one of the two or more respective core network slices is the core network slice associated to the PDU session associated to the SIP invite message.

Corresponding embodiments of an HSS for an IMS are also disclosed. In one embodiment, an HSS for an IMS is adapted to, for each of two or more IMS registrations of a UE for a same IMPI/IMPU for IMS PDU sessions over two or more respective core network slices, store information that indicates a core network slice used for an IMS PDU session of the UE associated to the IMS registration. The HSS is further adapted to receive, from an I-CSCF, a query comprising an IMPU of the UE from a SIP invite message and determine a S-CSCF associated to the IMPU of the UE and one of the two or more respective core network slices. The one of the two or more respective core network slices is either: a core network slice indicated in the SIP invite message and the query, a core network slice that is assumed by the HSS to be a correct core network slice for the SIP invite message, or a core network slice associated to a PDU session associated to the SIP invite message. The HSS is further adapted to send, to the I-CSCF, information that indicates the determined S-CSCF.

Corresponding embodiments of an IMS physical infrastructure node that implements an HSS for an IMS are also disclosed. In one embodiment, an IMS physical infrastructure node that implements an HSS for an IMS comprises a network interface and processing circuitry associated with the network interface. The processing circuitry is configured to cause the IMS physical infrastructure node to, for each of two or more IMS registrations of a UE for a same IMPI/IMPU for IMS PDU sessions over two or more respective core network slices, store information that indicates a core network slice used for an IMS PDU session of the UE associated to the IMS registration. The processing circuitry is further configured to cause the IMS physical infrastructure node to receive, from an I-CSCF, a query comprising an IMPU of the UE from a SIP invite message and determine a S-CSCF associated to the IMPU of the UE and one of the two or more respective core network slices. The one of the two or more respective core network slices is either: a core network slice indicated in the SIP invite message and the query, a core network slice that is assumed by the HSS to be a correct core network slice for the SIP invite message, or a core network slice associated to a PDU session associated to the SIP invite message. The processing circuitry is further configured to cause the IMS physical infrastructure node to send, to the I-CSCF, information that indicates the determined S-CSCF.

Embodiments of a method performed by an I-CSCF for an IMS are also disclosed. In one embodiment, a method performed by an I-CSCF for an IMS comprises receiving a SIP invite message comprising an IMPU of a UE and sending, to a HSS, a query comprising the IMPU of the UE. The method further comprises receiving, from the HSS, information that indicates a S-CSCF associated to the IMPU of the UE and one of the two or more respective core network slices. The one of the two or more respective core network slices is either: a core network slice indicated in the SIP invite message and the query, a core network slice that is assumed by the HSS to be a correct core network slice for the SIP invite message, or a core network slice associated to a PDU session associated to the SIP invite message. The method further comprises forwarding the SIP invite message to the determined S-CSCF.

In one embodiment, the SIP invite message comprises information that indicates the core network slice, the query sent from the I-CSCF to the HSS comprises information that indicates the core network slice, and the one of the two or more respective core network slices is the core network slice indicated by the information comprised in the SIP invite message and the query. In another embodiment, the one of the two or more respective core network slices is the core network slice that is assumed by the HSS to be the correct core network slice for the SIP invite message. In one embodiment, the SIP invite message is received from another IMS.

In one embodiment, the one of the two or more respective core network slices is the core network slice associated to the PDU session associated to the SIP invite message. In one embodiment, the SIP invite message is received from another IMS node in the IMS.

Corresponding embodiments of an I-CSCF for an IMS are also disclosed. In one embodiment, an I-CSCF for an IMS is adapted to receive a SIP invite message comprising an IMPU of a UE and send, to a HSS, a query comprising the IMPU of the UE. The I-CSCF is further adapted to receive, from the HSS, information that indicates a S-CSCF associated to the IMPU of the UE and one of the two or more respective core network slices. The one of the two or more respective core network slices is either: a core network slice indicated in the SIP invite message and the query, a core network slice that is assumed by the HSS to be a correct core network slice for the SIP invite message, or a core network slice associated to a PDU session associated to the SIP invite message. The I-CSCF is further adapted to forward the SIP invite message to the determined S-CSCF.

Corresponding embodiments of an IMS physical infrastructure node that implements an I-CSCF are also disclosed. In one embodiment, an IMS physical infrastructure node that implements an I-CSCF for an IMS comprises a network interface and processing circuitry associated with the network interface. The processing circuitry is configured to cause the IMS physical infrastructure node to receive a SIP invite message comprising an IMPU of a UE and send, to a HSS, a query comprising the IMPU of the UE. The processing circuitry is further configured to cause the IMS physical infrastructure node to receive, from the HSS, information that indicates a S-CSCF associated to the IMPU of the UE and one of the two or more respective core network slices. The one of the two or more respective core network slices is either: a core network slice indicated in the SIP invite message and the query, a core network slice that is assumed by the HSS to be a correct core network slice for the SIP invite message, or a core network slice associated to a PDU session associated to the SIP invite message. The processing circuitry is further configured to cause the IMS physical infrastructure node to forward the SIP invite message to the determined S-CSCF.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
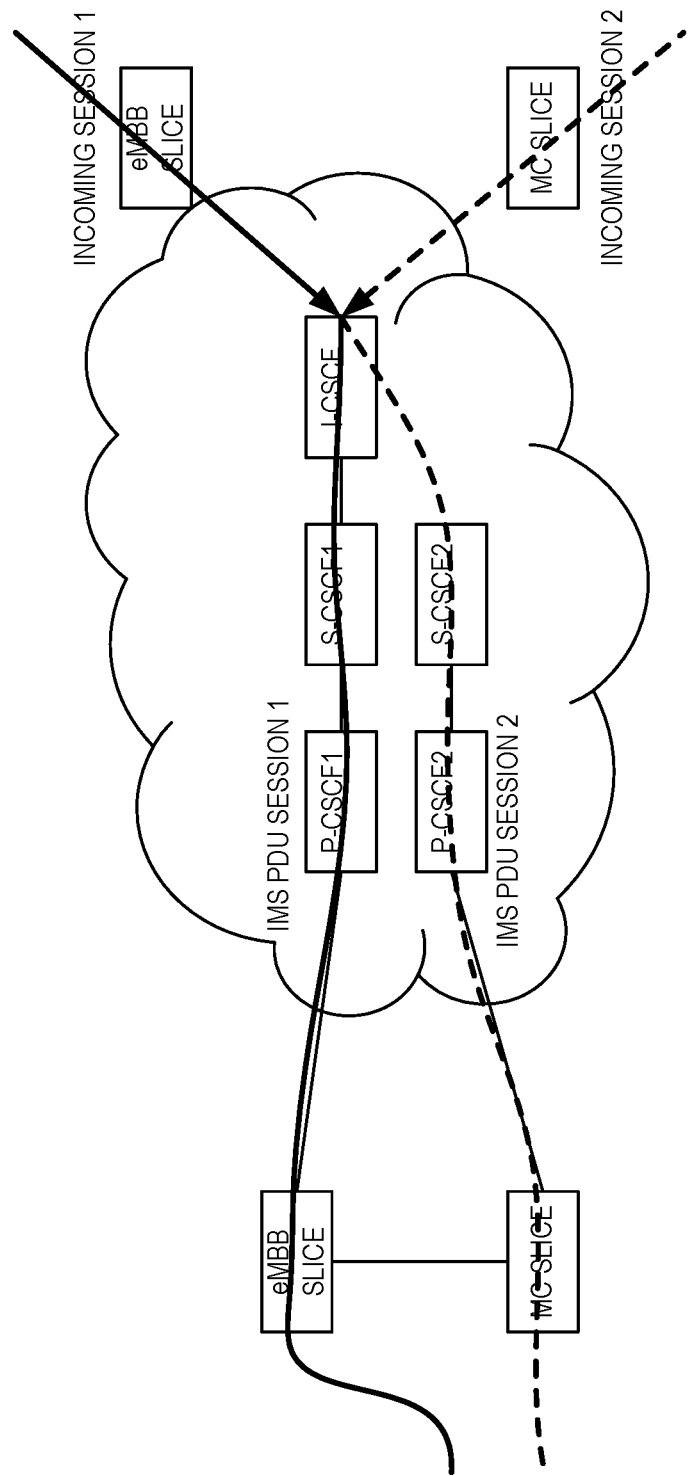
FIG. 1 illustrates a problem with respect to a conventional Internet Protocol (IP) Multimedia Subsystem (IMS)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Internet Protocol (IP) Multimedia System (IMS) Node: As used herein, an "IMS node" is any type of node in an IMS. The IMS node may be a virtualized node in an IMS network slice.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

The description provided herein is based on the following assumptions:

1. It is assumed that only standard Single Network Slice Assistance Information (S-NSSAI) is used (e.g., eMBB). This is the main use case for the embodiments of the present disclosure, and, for Internet Protocol (IP) Multimedia Subsystem (IMS), it is practically all that is needed.
2. The User Equipment (UE) has a single Mobile Station International Subscriber Directory Number (MSISDN) and has established two different IMS Protocol Data Unit (PDU) sessions for different applications, each session using a different S-NSSAI slice (i.e., different 5GC slice). Each application has a different contact (also referred to herein as different contact information) when registering in the IMS, including different capabilities (feature tags) and IP addresses.
3. IMS slicing is used. IMS slicing is described, e.g., in Patent Cooperation Treaty (PCT) Patent Application Publication No. WO 2019/150245 A1, entitled NETWORK SLICING IN IMS. Using IMS slicing means that different IMS services can be assigned different Serving Call Session Control Function (S-CSCFs) dedicated for the requested service.

With the above assumptions, a UE can establish two IMS Protocol Data Unit (PDU) sessions using different 5GC network slices using the same IP Multimedia Private Identity (IPMI)/IP Multimedia Public Identity (IMPU). For example, a UE can have two IMS registrations over the two IMS PDU sessions—one for regular Multimedia Telephony (MMTEL) service using an enhanced Mobile Broadband (eMBB) 5GC slice and the other one for Mission Critical (MC) IMS services using a MC 5GC slice. Each IMS registration can have a different Proxy Call Session Control Function (P-CSCF) and can have a different S-CSCF or the same S-CSCF.

The UE can receive regular incoming IMS sessions over the IMS PDU session associated with the eMBB network slice, while the same UE can receive incoming MC IMS sessions over the IMS PDU session associated with the MC 5GC slice. However, IMS nodes that receive an incoming session need to decide which UE contact to use for the incoming session. This implies selecting the correct S-CSCF, the correct P-CSCF, and the correct UE contact.

If the same S-CSCF is used based on current limitations in IMS, then this can be resolved by existing legacy solutions. However, if different S-CSCFs are used, the existing solutions do not work.

FIG. 1 illustrates this problem that the embodiments of the solutions described herein are solving. The Interrogating Call Session Control Function (I-CSCF) needs to ensure that the correct S-CSCF/P-CSCF and UE contact receive the incoming IMS session according to the 5GC slice over which the session arrived. FIG. 1 implies that a terminating MC call must use S-CSCF2 to end up selecting the MC slice, while a terminating regular Voice of Long Term Evolution (VoLTE) session must use S-CSCF1 to end up selecting the eMBB slice for the target UE. The I-CSCF needs to make the correct decision as described above.

Certain aspects of the present disclosure and their embodiments may provide solutions to the aforementioned or other challenges. Embodiments of the present disclosure ensure that the I-CSCF and other IMS nodes identify the 5GC slice used for an incoming session to enable locating the proper IMS nodes for terminating the session to the intended target. Embodiments of the present disclosure ensure that the I-CSCF and other IMS nodes identify IMS nodes (e.g., S-CSCF/P-CSCF) for terminating an incoming IMS session to an intended UE via a respective 5GC slice when the UE having a single MSISDN has two or more IMS sessions established over two or more 5GC slices using the same IMPI/IMPU.

Two solutions are disclosed herein, namely, an IMS solution and non-IMS solution. For the IMS-solution, additional behavior is provided in the I-CSCF, HSS, and S-CSCF to support the correct routing. These are the IMS nodes involved in a terminating session. Details are described below.

For the non-IMS solution, a UE centric solution and a network-centric solution are disclosed. In the UE centric solution, the UE provides, at IMS registration, information that indicates the 5GC slice associated with the IMS PDU session associated with this registration. This information that indicates the 5GC slice associated with the IMS PDU session associated with this registration is stored in (or otherwise made available to) all IMS nodes that need it for proper routing of a terminating IMS session and session initiation. In the network centric solution, the network derives the 5GC slice associated with the incoming IMS registration and returns information that indicates the 5GC slice to the UE in the SIP 200 OK response to the IMS registration. IMS nodes that need this information will now store this information (or this information is otherwise made available to those IMS nodes). The network locates the Subscription Permanent Identifier (SUPI) that maps to the International Mobile Subscriber Identity (IMSI)/MSISDN for the registering IMS UE (also referred to herein as IMS user), then locates the PDU session associated with the IMS PDU session over which the IMS registration arrives, and then locates the 5GC slice used for that PDU session.

Certain embodiments may provide one or more of the following technical advantage(s). Embodiments disclosed herein provide a simple way of allowing an IMS user to establish multiple PDU sessions for different purposes and allowing different S-CSCFs to be used for supporting these services using the same identity (IMPI/IMPU) while ensuring proper routing for terminating sessions.

Figure 2:
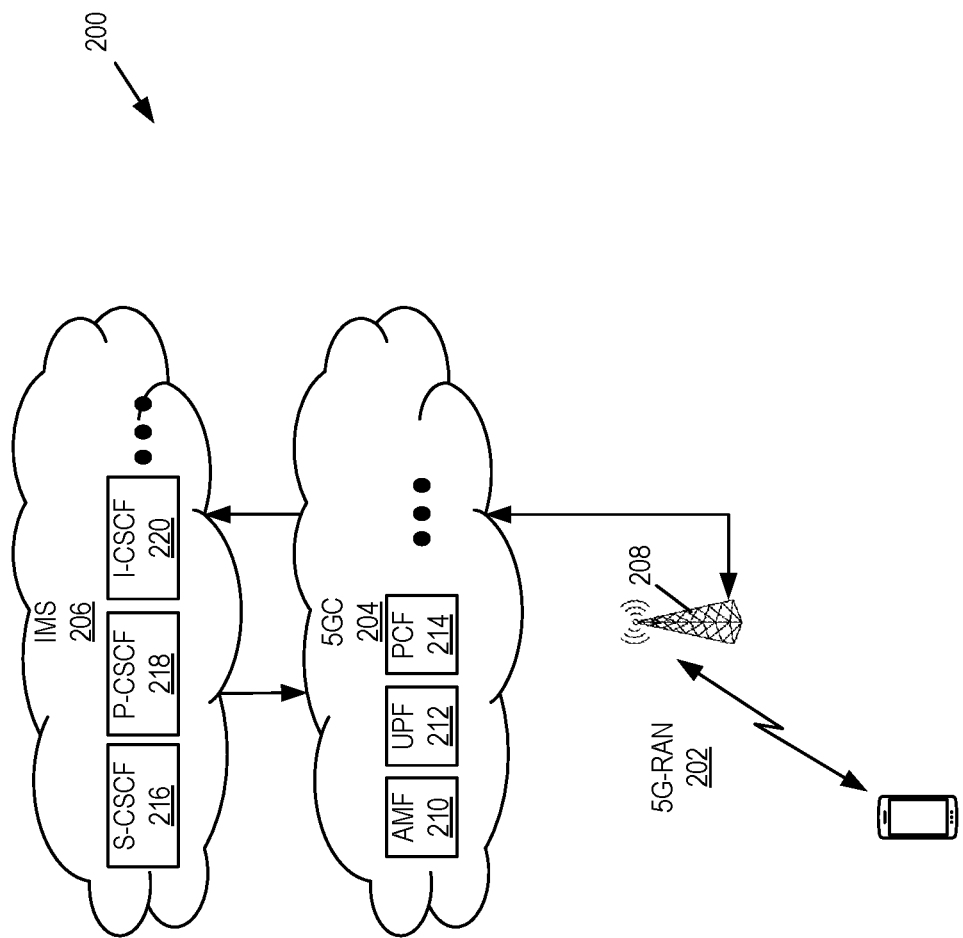
FIG. 2 illustrates an example of a system including a Fifth Generation System (5GS) and an IMS.

Before describing embodiments of the present disclosure, a brief description of network slicing in the 5GC (i.e., 5GC slicing) is beneficial. In this regard, FIG. 2 illustrates an example of a system 200 including a 5G Radio Access Network (RAN) 202, a 5G Core Network (5GC) 204, and an Internet Protocol (IP) Multimedia Subsystem (IMS) 206. Together, the 5G RAN 202 and the 5GC 204 are referred to as a 5GS. As illustrated, the 5G RAN 202 includes a number of radio access nodes 208 (referred to as New Radio (NR) base stations (gNBs)). The 5GC 204 includes a number of core network nodes, or core network functions, such as, e.g., an Access and Mobility Function(s) (AMF(s)) 210, a User Plane Function(s) (UPF(s)) 212, a Policy Control Function(s) (PCF(s)) 214, etc. The IMS 206 includes a number of IMS nodes such as, e.g., a Serving Call Session Control Function(s) (S-CSCF(s)) 216, a Proxy Call Session Control Function(s) (P-CSCF(s)) 218, I-CSCF(s) 220, etc.

Figure 3:
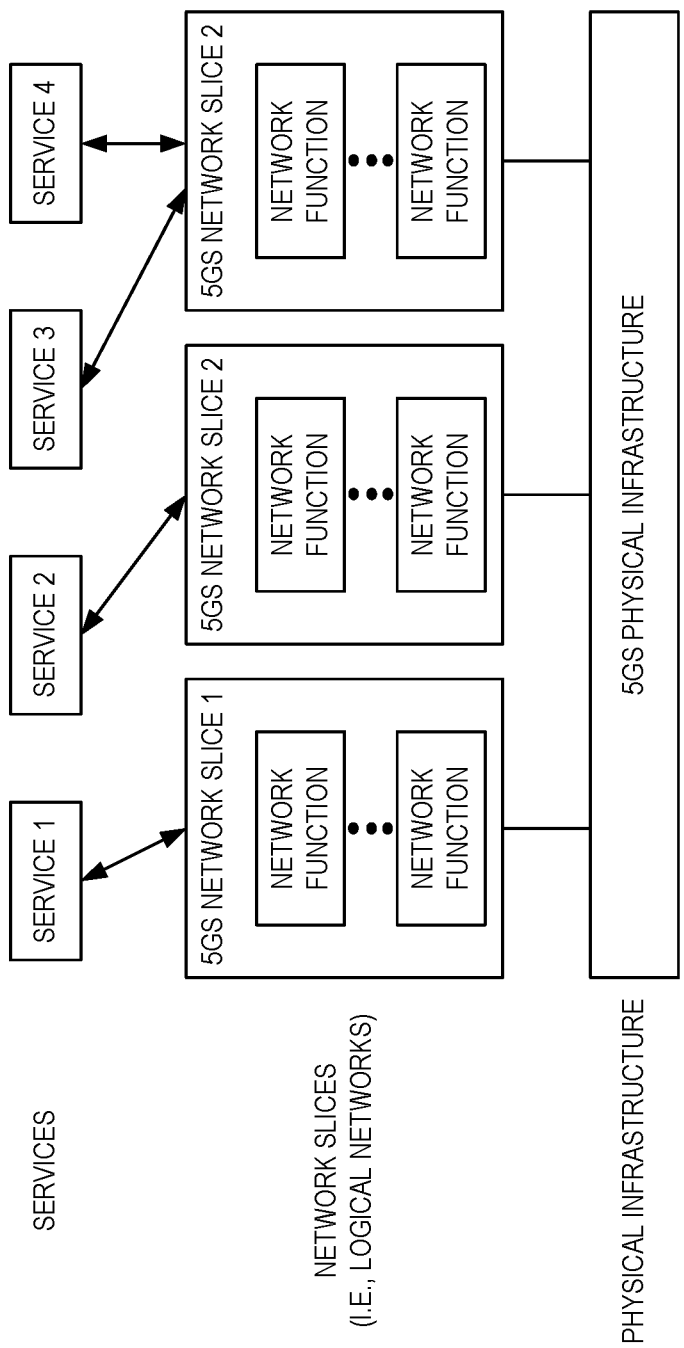
FIG. 3 illustrates network slicing within the 5GS.

FIG. 3 illustrates the concept of network slicing with respect to the 5GS. As shown in FIG. 3, the 5GS supports multiple services. In this example, there are four services labelled as Service 1, Service 2, Service 3, and Service 4. Example services include, but are not limited to, enhanced Mobile Broadband (eMBB), Ultra Reliable Low Latency Communication (URLLC), massive Machine Type Communication (mMTC) or massive Internet of Things (IoT), emergency services, and/or the like. As shown, each of the services is mapped to a 5GS network slice that is customized to meet the needs of that service. Note that more than one service may be mapped to the same 5GS network slice. As also illustrated in FIG. 3, the 5GS network slices are implemented on the same physical infrastructure.

Figure 4:
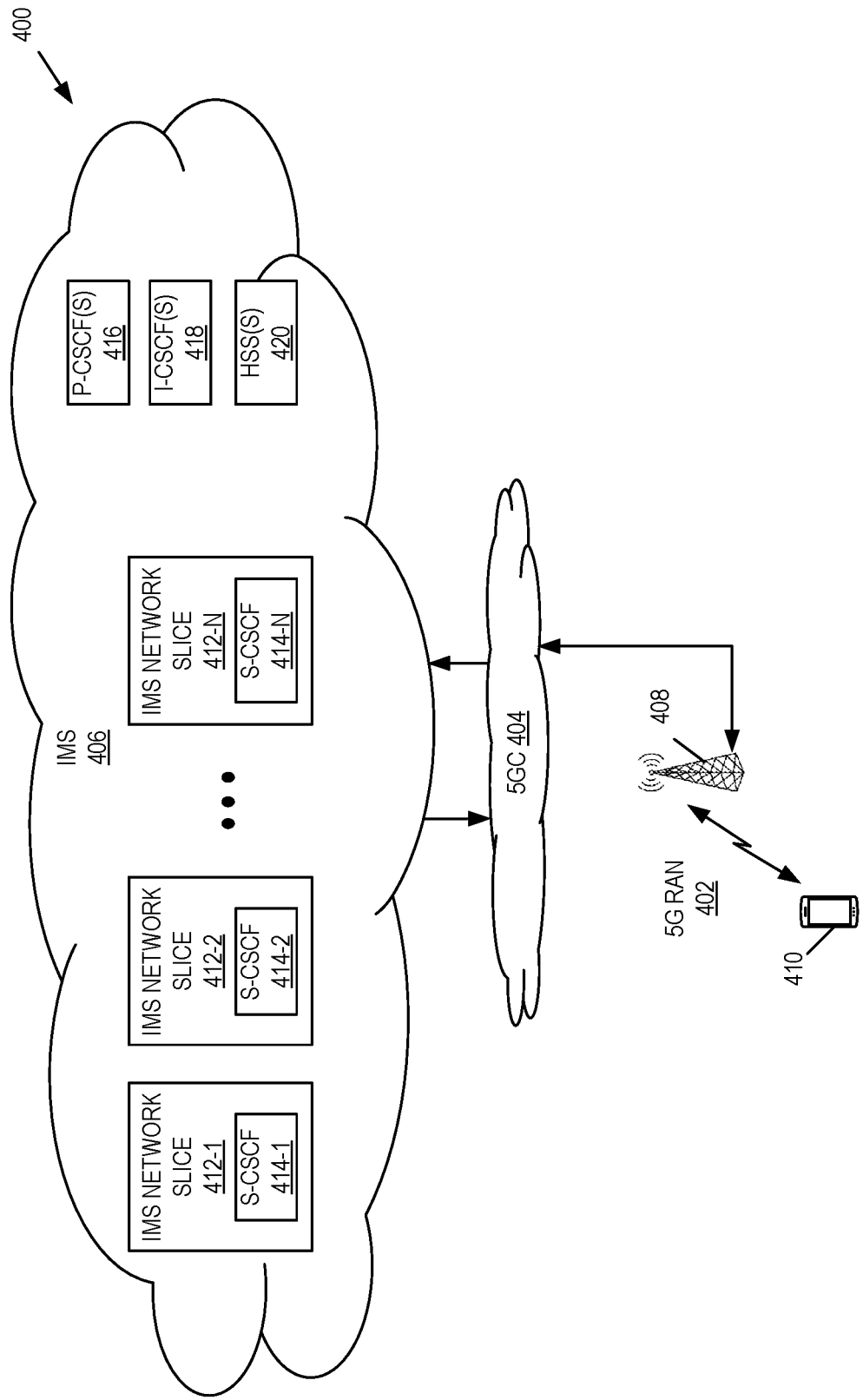
FIG. 4 illustrates one example of a wireless communication system in which embodiments of the present disclosure may be implemented.

Embodiments of the present disclosure relate to network slicing in the IMS. In this regard, FIG. 4 illustrates one example of a wireless communication system 400 in which embodiments of the present disclosure may be implemented. In the embodiments described herein, the wireless communication system 400 is a 5GS including a 5G RAN 402 and a 5GC 404. The wireless communication system 400 also includes an IMS 406. As illustrated, the 5G RAN 402 includes a number of base stations 408, which are referred to as gNBs in 3GPP 5G, serving a number of wireless devices 410, which are also referred to herein as UEs 410. The base stations 408 are connected to the 5GC 404. The 5GC 404 is connected to the IMS 406. Notably, 5GC slicing is implemented in the 5GC 404, e.g., as described above with respect to FIG. 3.

In the embodiments described herein, the IMS 406 includes a number of IMS network slices 412-1 through 412-N. The IMS network slices 412-1 through 412-N include respective S-CSCFs 414-1 through 414-N. The IMS network slices 412-1 through 412-N are generally referred to herein as IMS network slices 412, and the S-CSCFs 414-1 through 414-N are generally referred to herein as S-CSCFs 414. The S-CSCFs 414 are virtual nodes (e.g., IMS entities that are implemented by a (physical) network node(s) (e.g., as a virtual entity such as, e.g., a virtual machine).

The IMS 406 also includes one or more P-CSCFs 416, one or more Interrogating Call Session Control Functions (I-CSCFs) 418, and one or more HSSs 420. As discussed above, in some embodiments, different P-CSCFs 416 can be associated with different IMS network slices 412. For example, each P-CSCF 416 may be associated with a different one of the IMS network slices 412 or each P-CSCF 416 may be associated with one or more of the IMS network slices 412.

Now, a description of some example embodiments of the present disclosure is provided.

IMS-Based Solution

Figure 5A:
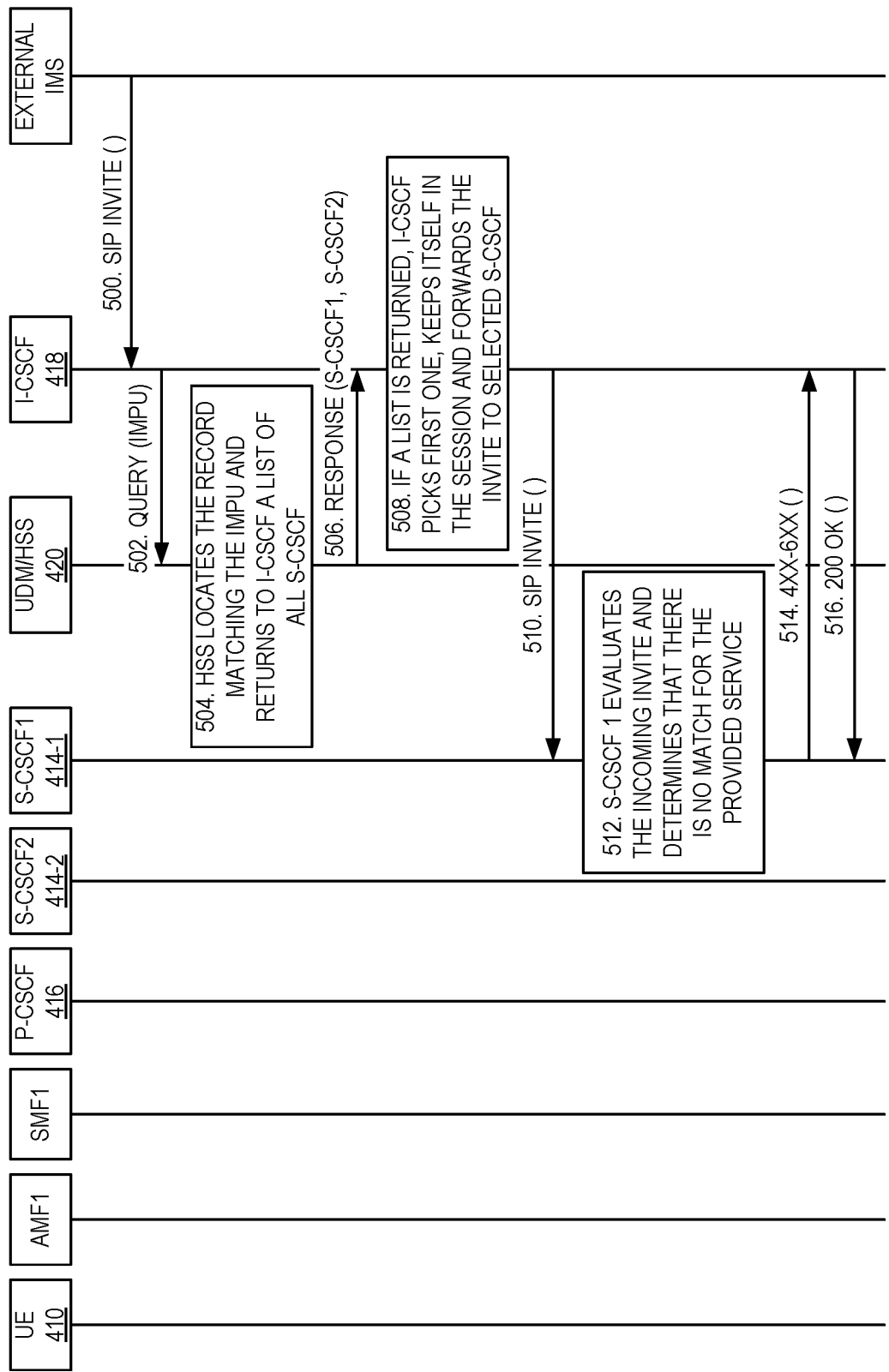
FIGS. 5A and 5B illustrate a call flow for an IMS-based solution in accordance with one embodiment of the present disclosure.
Figure 5B:
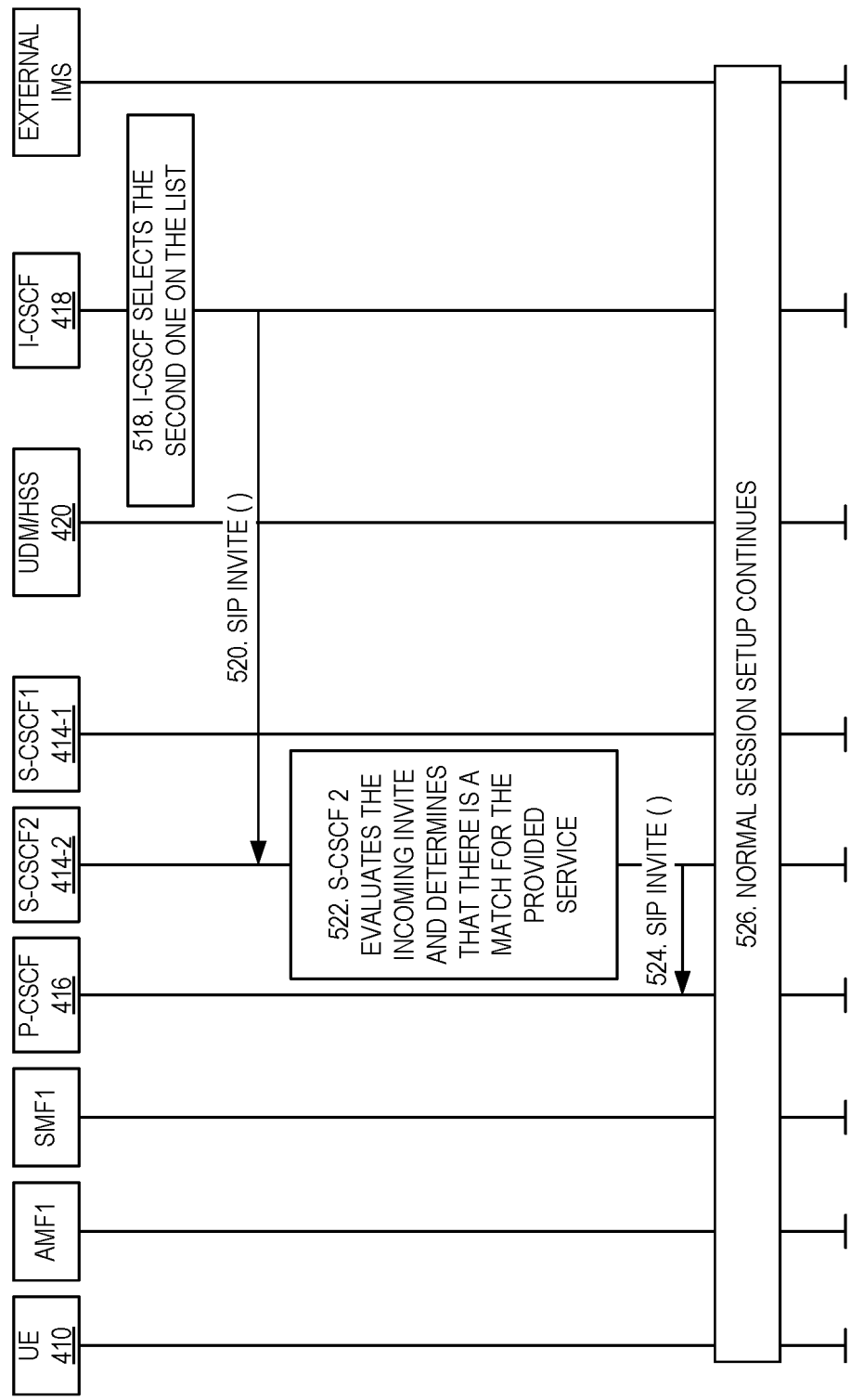

FIGS. 5A and 5B illustrate a call flow for an IMS-based solution in accordance with some embodiments of the present disclosure. The steps of this call flow are as follows:

Steps 500 and 502: Steps 500 and 502 are normal steps based on current specification. More specifically, the I-CSCF 418 receives a SIP invite message from an external IMS for an incoming IMS session (step 500). The SIP invite includes the IMPU of a target subscriber (i.e., the IMPU of a target UE) for the incoming IMS session. In response to the SIP invite, the I-CSCF 418 sends a query to the HSS 420 for the S-CSCF 414 handling the subscriber identified by the IMPU in the incoming SIP invite message (step 502).

Step 504: In step 504, the HSS 420 locates a record matching the IMPU provided in the query, where this record includes a list of S-CSCFs 414 handling this subscriber. In this example, the list of S-CSCFs 414 includes S-CSCF1 414-1 and S-CSCF2 414-2.

Step 506: The HSS 420 returns the list of S-CSCFs 414 handling this subscriber to the I-CSCF 418. Steps 504 and 506 define new behavior for the HSS 420, as compared to conventional HSSs. Conventionally, an HSS returns only one S-CSCF because only one is allowed to handle an IMPU/IMPI pair.

Step 508: The I-CSCF 418 receives the list of S-CSCFs 414 handling the subscriber and picks any one of the S-CSCFs 414 in the list. In this example, the selected S-CSCF 414 is the S-CSCF1 414-1.

Step 510: The I-CSCF 418 forwards the SIP invite message to S-CSCF1 414-1.

Step 512: S-CSCF1 414-1 evaluates the incoming SIP invite message to determine whether S-CSCF1 can locate a UE contact that matches a requested service identified in the incoming SIP invite message. If S-CSCF1 414-1 can locate a match, it accepts the incoming IMS session. Otherwise, S-CSCF1 414-1 rejects the incoming IMS session. Note that the feature tags that a contact can support are identified through feature tags during IMS registration and stored in the S-CSCF 414-1. These feature tags reflect the services that the contact supports (e.g., VoLTE, Mission Critical, etc.). As for determining a UE contact that matches a requested service identified in the incoming SIP invite, in general, the Session Description Protocol (SDP) information in the SIP invite identifies the requested service. This is compared against the feature tags for the contacts the S-CSCF 414-1 has stored for contacts associated with the target IMPU. The SIP invite can also have some headers that further restrict what contacts are to be selected. So, there are multiple ways that a match can be determined and that can be used in any combination.

Step 514: In this particular example, S-CSCF1 414-1 cannot locate a match and, as such, sends a message back to the I-CSCF 418 that rejects the incoming IMS session.

Step 516: The I-CSCF 418 may then acknowledge rejection/error message.

Step 518: Since S-CSCF1 414-1 rejected the incoming IMS session, the I-CSCF 418 selects a different S-CSCF 414 from the list of S-CSCFs 414 obtained in step 508. In this example, the I-CSCF 418 selects S-CSCF2 414-2.

Step 520: The I-CSCF 418 forwards the SIP invite message to S-CSCF2 414-2.

Step 522: S-CSCF2 414-2 evaluates the incoming SIP invite message to determine whether S-CSCF2 414-2 can locate a UE contact that matches a requested service identified in the incoming SIP invite message. If S-CSCF2 414-2 can locate a match, it accepts the incoming IMS session. Otherwise, S-CSCF2 414-2 rejects the incoming IMS session.

Step 524: In this particular example, S-CSCF2 414-2 is able to locate a match and, as such, forwards the SIP invite message to an associated P-CSCF 416.

Step 526: From this point, normal setup of the incoming IMS session continues.

In the process of FIGS. 5A and 5B, the I-CSCF 418 uses "serial forking" to try the S-CSCFs 414 in the list returned by the HSS 420 (in step 502 of FIG. 5A) for the particular subscriber one at a time. The HSS 420 also has new functionality in that it returns the list of S-CSCFs. The S-CSCF 414 (e.g., S-CSCF1 414-1 and S-CSCF2 414-2 of FIGS. 5A and 5B) each also has additional behavior since it has to check the incoming SIP INVITE to sees if the S-CSCF 414 has the correct contact to handle the SIP INVITE. In conventional IMS systems, the conventional S-CSCF selects the most probable UE contact for the SIP INVITE; however, in the embodiment described above, the S-CSCF 414 is looking for an exact match between the UE contact and the requested service from the SIP INVITE.

Figure 6A:
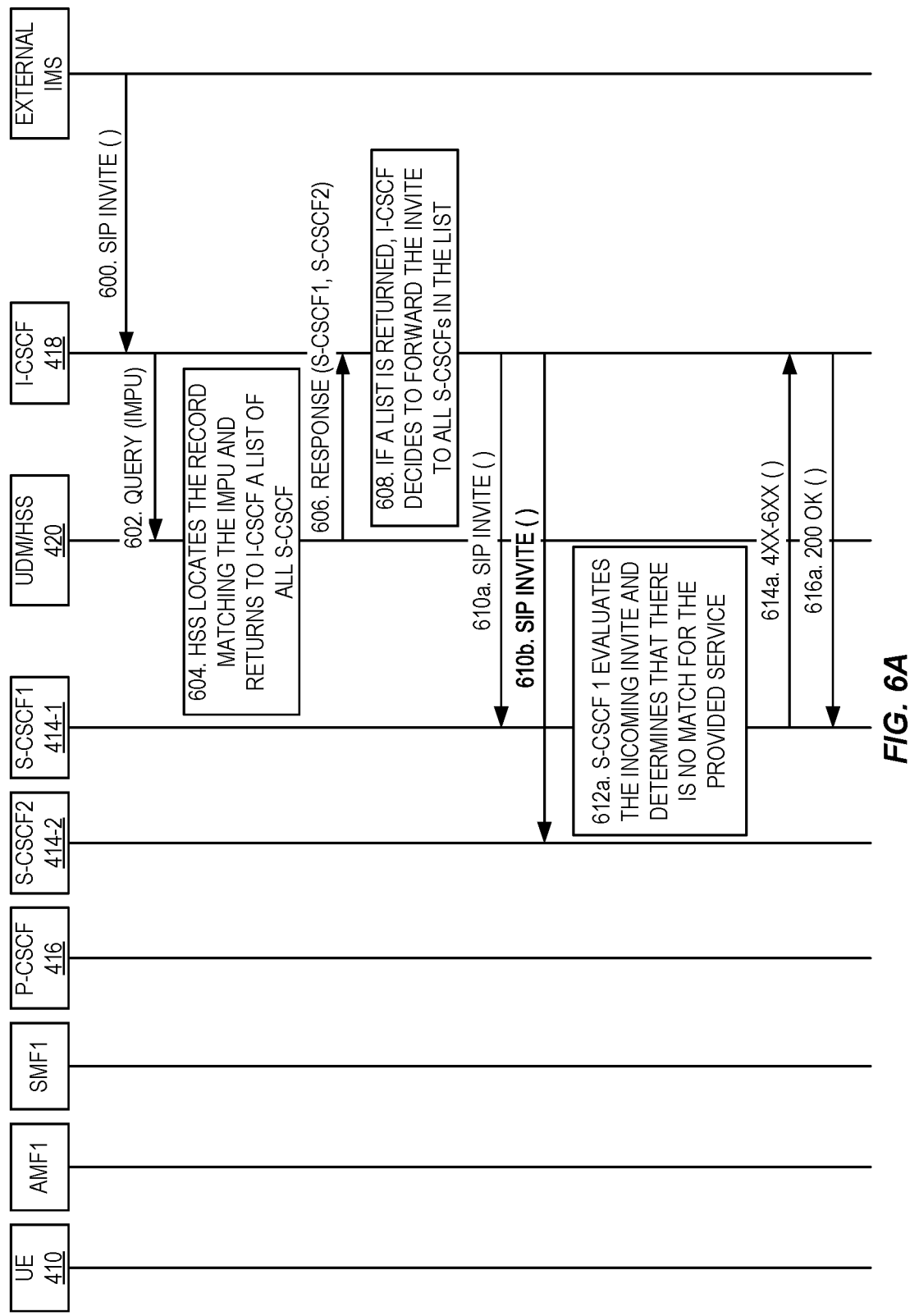
FIGS. 6A and 6B illustrate a call flow for an IMS-based solution in accordance with another embodiment of the present disclosure.
Figure 6B:
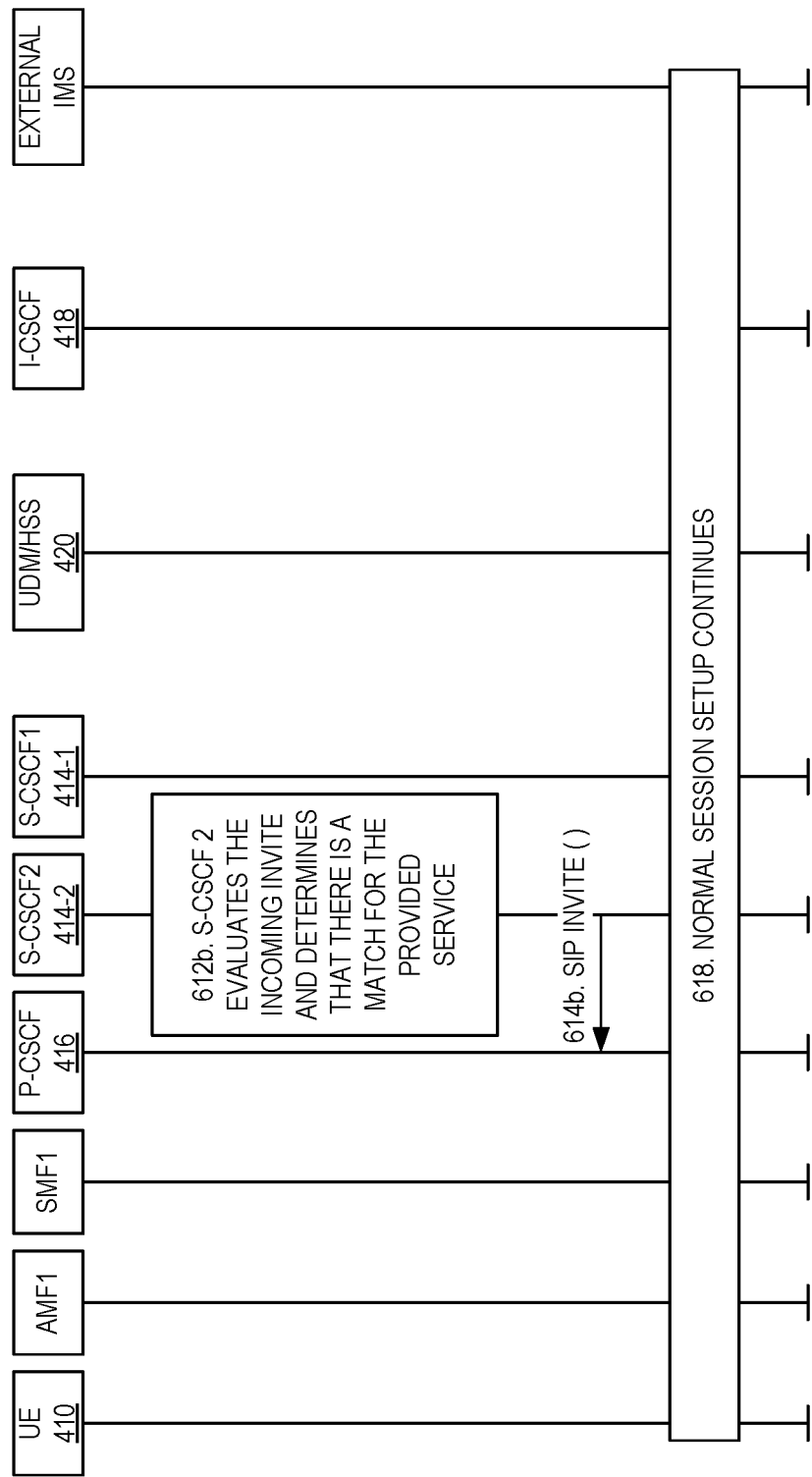

FIGS. 6A and 6B illustrate a call flow for another embodiment in which parallel forking is utilized by the I-CSCF 418. The steps of this call flow are as follows:

Steps 600 and 602: Steps 600 and 602 are normal steps based on current specification. More specifically, the I-CSCF 418 receives a SIP invite message from an external IMS for an incoming IMS session (step 600). The SIP invite includes the IMPU of a target subscriber (i.e., the IMPU of a target UE) for the incoming IMS session. In response to the SIP invite, the I-CSCF 418 sends a query to the HSS 420 for the S-CSCF 414 handling the subscriber identified by the IMPU in the incoming SIP invite message (step 602).

Step 604: In step 604, the HSS 420 locates a record matching the IMPU provided in the query, where this record includes a list of S-CSCFs 414 handling this subscriber. In this example, the list of S-CSCFs 414 includes S-CSCF1 414-1 and S-CSCF2 414-2.

Step 606: The HSS 420 returns the list of S-CSCFs handling this subscriber to the I-CSCF 418. Steps 604 and 606 define new behavior for the HSS 420, as compared to conventional HSSs. Conventionally, an HSS returns only one S-CSCF because only one is allowed to handle an IMPU/IMPI pair.

Step 608: The I-CSCF 418 receives the list of S-CSCFs 414 handling the subscriber. In some embodiments, the I-CSCF 418 makes a decision to forward the SIP invite message to all of the S-CSCFs 414 in the received list. In this example, the list includes S-CSCF1 414-1 and S-CSCF2 414-2.

Steps 610a and 610b: The I-CSCF 418 forwards the SIP invite message to both S-CSCF1 414-1 and S-CSCF2 414-2.

Step 612a: S-CSCF1 414-1 evaluates the incoming SIP invite message to determine whether S-CSCF1 414-1 can locate a UE contact that matches a requested service identified in the incoming SIP invite message. If S-CSCF1 414-1 can locate a match, it accepts the incoming IMS session. Otherwise, S-CSCF1 414-1 rejects the incoming IMS session.

Step 614a: In this particular example, S-CSCF1 414-1 cannot locate a match and, as such, sends a message back to the I-CSCF 418 that rejects the incoming IMS session.

Step 616a: The I-CSCF 418 may then acknowledge rejection/error message.

Step 612b: S-CSCF2 414-2 evaluates the incoming SIP invite message to determine whether S-CSCF2 414-2 can locate a UE contact that matches a requested service identified in the incoming SIP invite message. If S-CSCF2 414-2 can locate a match, it accepts the incoming IMS session. Otherwise, S-CSCF2 414-2 rejects the incoming IMS session.

Step 614b: In this particular example, S-CSCF2 414-2 is able to locate a match and, as such, forwards the SIP invite message to an associated P-CSCF 416.

Step 618: From this point, normal setup of the incoming IMS session continues.

In the process of FIGS. 6A and 6B, the I-CSCF 418 attempts to reach all S-CSCFS 414 in the list received for the subscriber (in step 606 of FIG. 6A) at the same time (steps 610a and 610b). Only one S-CSCF 414 (S-CSCF 2 in the example of FIGS. 6A and 6B) will accept the session Note that the embodiments described above with respect to FIGS. 5A and 5B and FIGS. 6A and 6B are SIP based solutions that do not require any interaction with the 5GC, nor do they have any impacts on the UE. These solutions rely on existing SIP capabilities to locate the proper route for a terminating IMS session. Hence, they are cheap to implement and deploy.

Non IMS Solution

UE Centric Solution (Option 1)

Figure 7A:
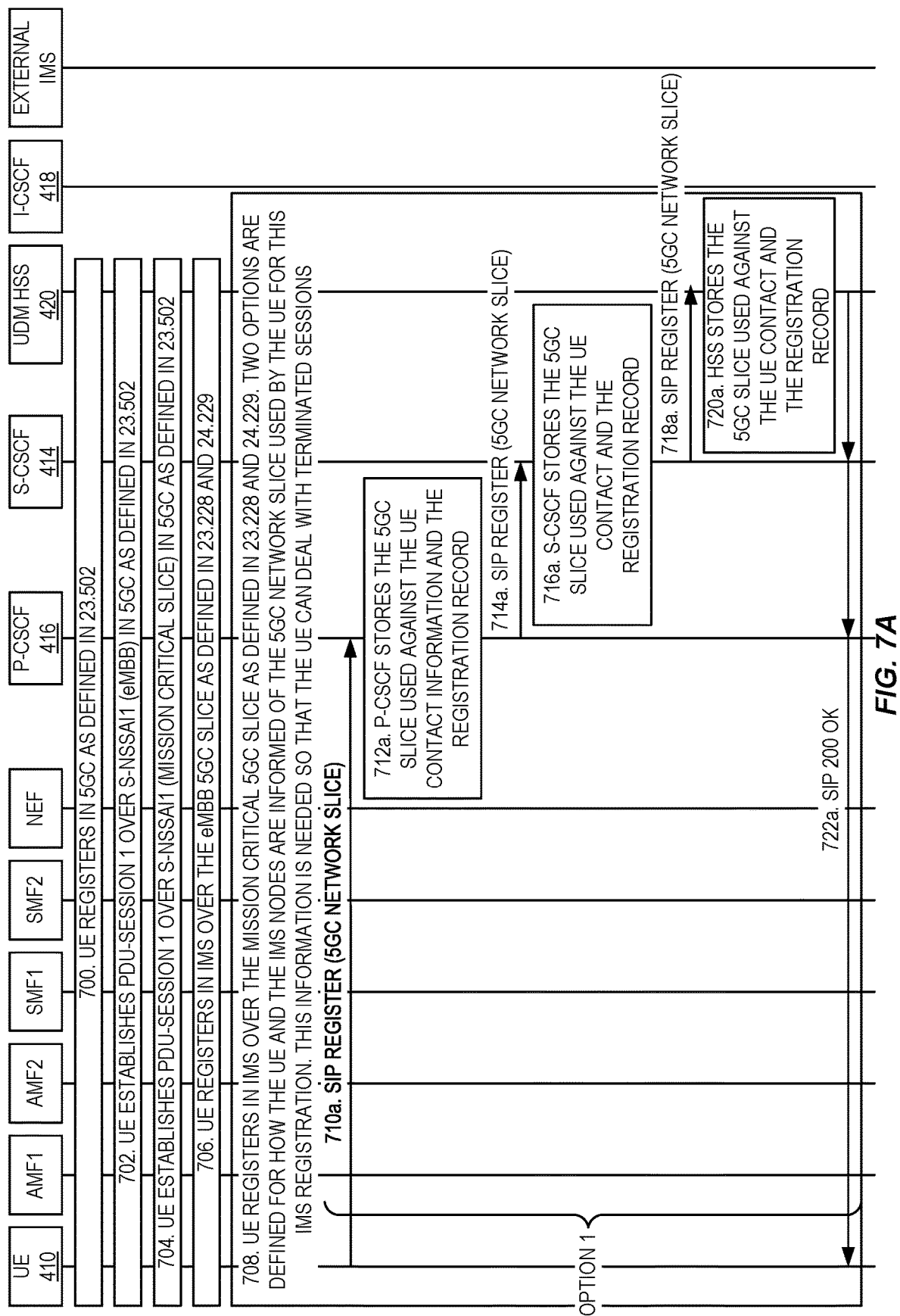
FIGS. 7A and 7B illustrate a call flow that shows both a User Equipment (UE) centric solution (option 1) and a network centric solution (option 2) in accordance with some other embodiments of the present disclosure.
Figure 7B:
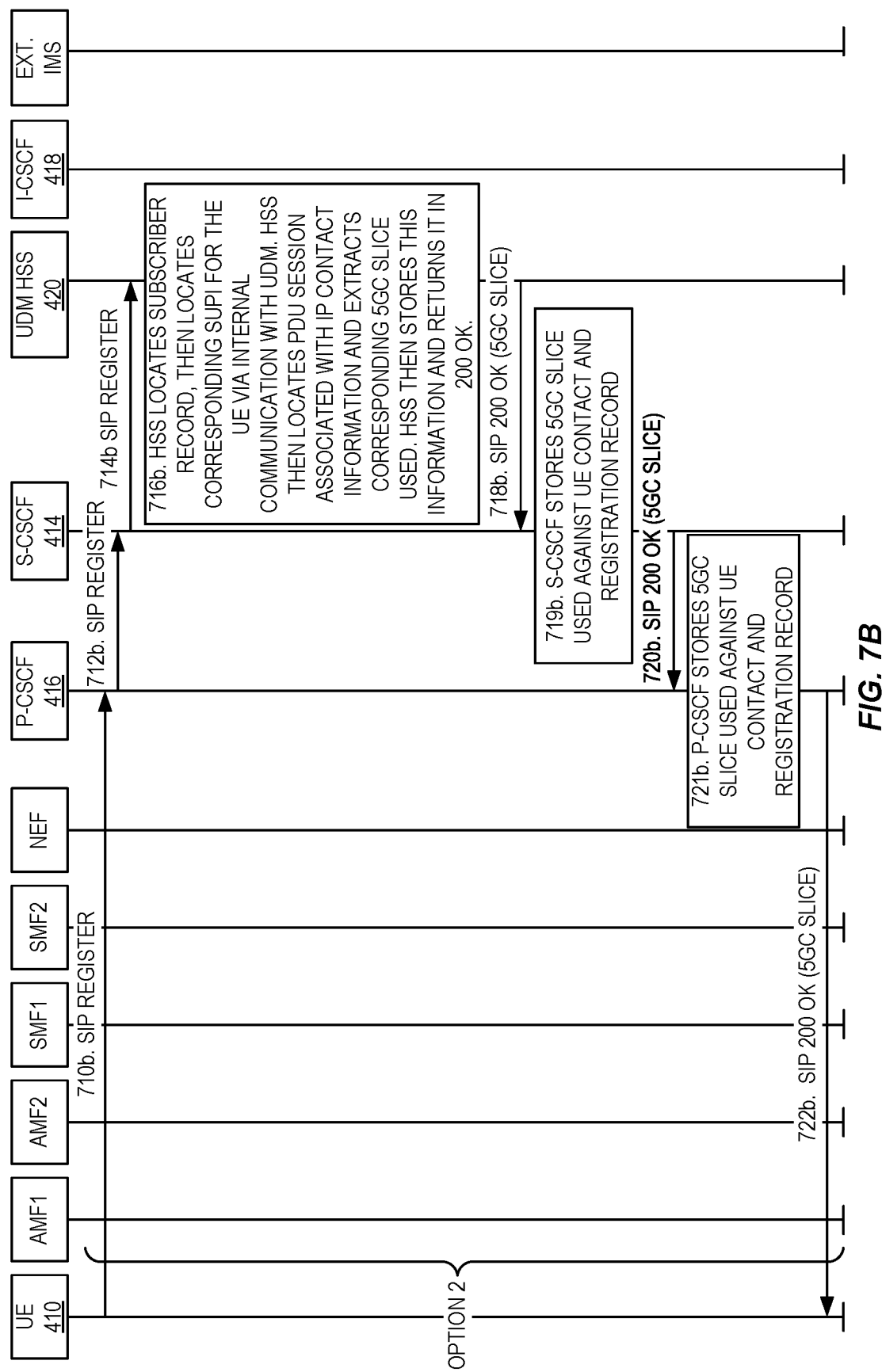

FIGS. 7A and 7B illustrate a call flow that shows both a UE centric solution (option 1) and a network centric solution (option 2) in accordance with some embodiments of the present disclosure.

Step 700: The UE 410 registers in the 5GC, e.g., as defined in 3GPP TS 23.502.

Step 702: The UE 410 establishes a PDU session (denoted as PDU-SESSION 1) over a particular S-NSSAI (denoted as S-NSSAI 1) (over the eMBB 5GC slice in this example), e.g., as defined in 3GPP TS 23.502.

Step 704: The UE 410 establishes a PDU session (denoted as PDU-SESSION 2 over a particular S-NSSAI (denoted as S-NSSAI 2 (over the MC 5GC slice in this example), e.g., as defined in 3GPP TS 23.502.

Step 706: The UE 410 registers in the IMS over the eMBB 5GC slice, e.g., as defined in TS 23.228 and TS 24.229.

Step 708a: The UE 410 registers in IMS over the MC 5GC slice, e.g., as defined in TS 23.228 and TS 24.229. Two options are defined for how the UE 410 and the IMS nodes are informed of the 5GC slice used by the UE 410 for this IMS registration. This enables forwarding an IMS session over the appropriate 5GC slice.

Option 1:

Step 710a: The UE 410 sends a SIP register message to a P-CSCF 416. In Option 1, this SIP register message includes information that indicates the 5GC slice over which the IMS registration is being performed.

Step 712a: The P-CSCF 416 stores information that indicates the 5GC network slice against (e.g., in association with) the UE contact for the UE 410 and the corresponding registration record.

Step 714a: The P-CSCF 416 forwards the SIP register message to an S-CSCF 414.

Step 716a: The S-CSCF 414 stores information that indicates the 5GC network slice against (e.g., in association with) the UE contact for the UE 410 and the corresponding registration record.

Step 718a: The S-CSCF 414 forwards the SIP register message to the HSS 420.

Step 720a: The HSS 420 stores information that indicates that 5GC network slice against (e.g., in association with) the UE contact and Registration status stored in HSS for the UE 410 and the corresponding registration record.

Step 722a: A SIP OK message is then sent by the HSS 420 and forwarded to the UE 410 via the S-CSCF 414 and P-CSCF 416.

Note that the above steps for Option 1 are repeated for each 5GC slice over which an IMS registration takes place, which results in, for this example, two IMS registrations, one via the eMBB 5GC slice and one via the MC 5GC slice.

Option 2:

Step 710b: The UE 410 sends a SIP register message to a P-CSCF 416.

Step 712b: The P-CSCF 416 forwards the SIP register message to an S-CSCF 414.

Step 714b: The S-CSCF 414 forwards the SIP register message to the HSS 420.

Steps 716b and 718b: The HSS 420 locates the corresponding subscriber record, then locates the corresponding SUPI for the UE 410 via internal communication with UDM, and then locates the PDU session associated with IP contact information and extracts the corresponding 5GC slice used. The HSS 420 then stores this information and returns it to the S-CSCF 414 in a SIP OK message.

Steps 719b and 720b: The S-CSCF 414 stores information that indicates the 5GC network slice used against (e.g., in association with) the UE contact for the UE 410 and the corresponding registration record and sends this information to the P-CSCS 416 via SIP OK message.

Steps 721b and 722b: The P-CSCF 416 stores the information that indicates the 5GC network slice against (e.g., in association with) the UE contact for the UE 410 and the corresponding registration record (step 721b) and sends a SIP OK message including this information to the UE 410 (step 722).

Note that the above steps for Option 2 are repeated for each 5GC slice over which an IMS registration occur, resulting in, in this example, two IMS registrations, one via the eMBB 5GC slice and one via the MC 5GC slice.

For option 1 (UE centric solution), it can be seen in the call flow that the UE 410 includes information that indicates the 5GC slice used for the IMS PDU session associated with the IMS PDN connection in IMS registration. The P-CSCS, S-CSCF, and HSS stores this information in the record associated with the registering IMPI/IMPU pair.

For option 2 (network centric solution), when the Registration Request arrives at the HSS 420, the HSS 420 locates the 5G record based on the SUPI associated with the IMS subscription IMSI/MSISDN, then fetches the PDU session associated with the Registration IP address information in the contact, extracts the 5GS slice used for this PDU session, and stores it in the HSS 420. This information is returned in the SIP 200 OK to IMS nodes as shown in the call flow.

So, both option 1 and option 2, ends up with the same outcome

Figure 8:
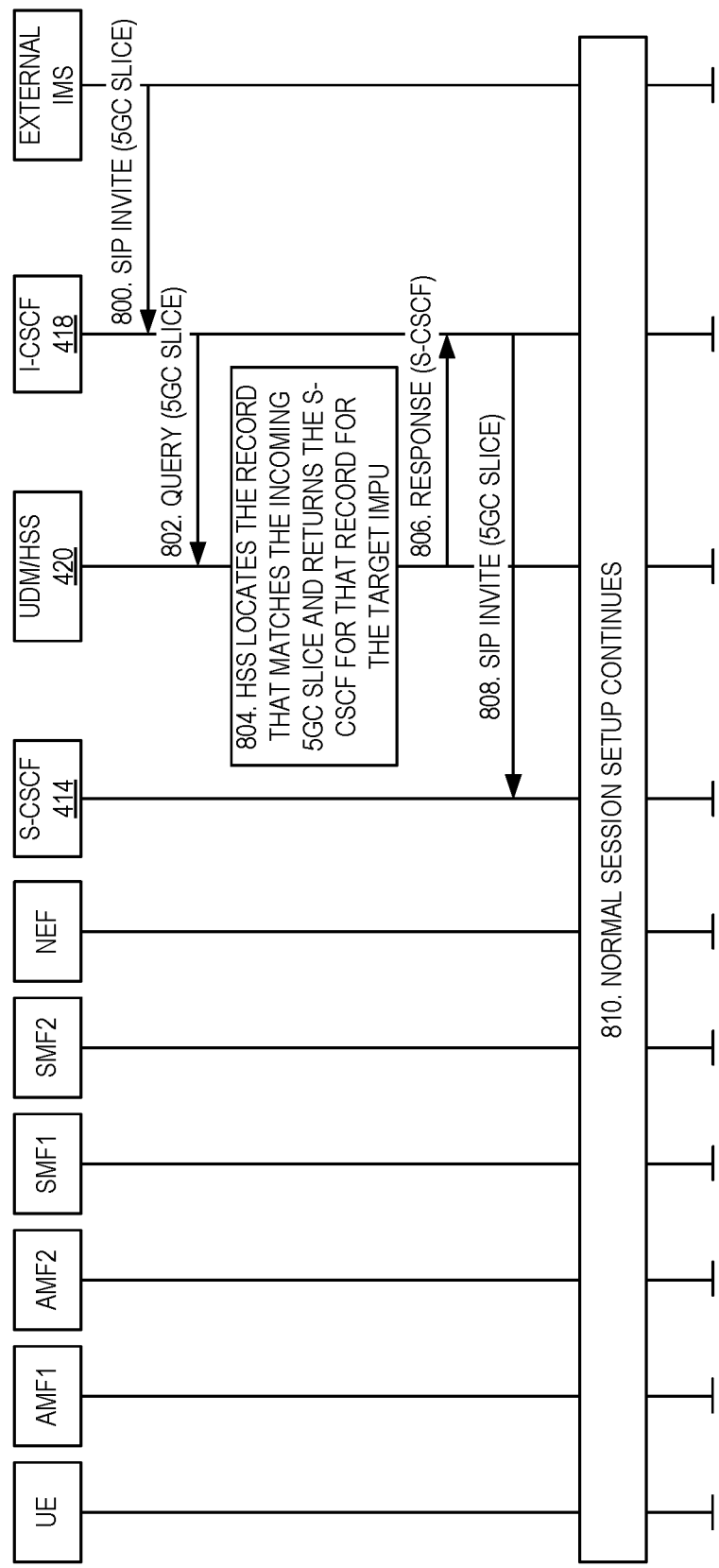
FIG. 8 illustrates a terminating session scenario in which an indication of the Fifth Generation Core (5GC) 5GC slice is included in the Session Initiation Protocol (SIP) invite message for the incoming IMS session in accordance with some embodiments of the present disclosure.
Figure 9:
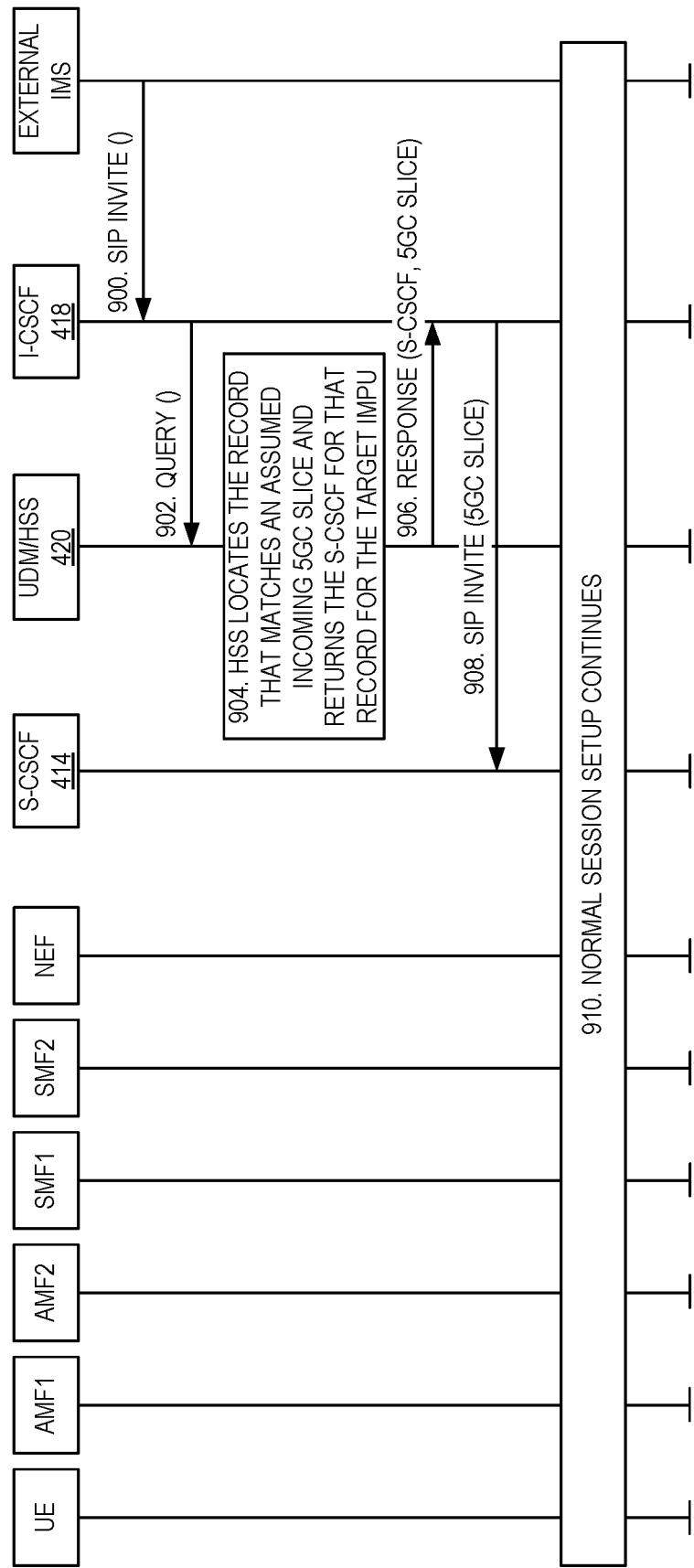
FIG. 9 illustrates a terminating session scenario in which an indication of the 5GC slice is not included in the SIP invite message for the incoming IMS session in accordance with some embodiments of the present disclosure.
Figure 10:
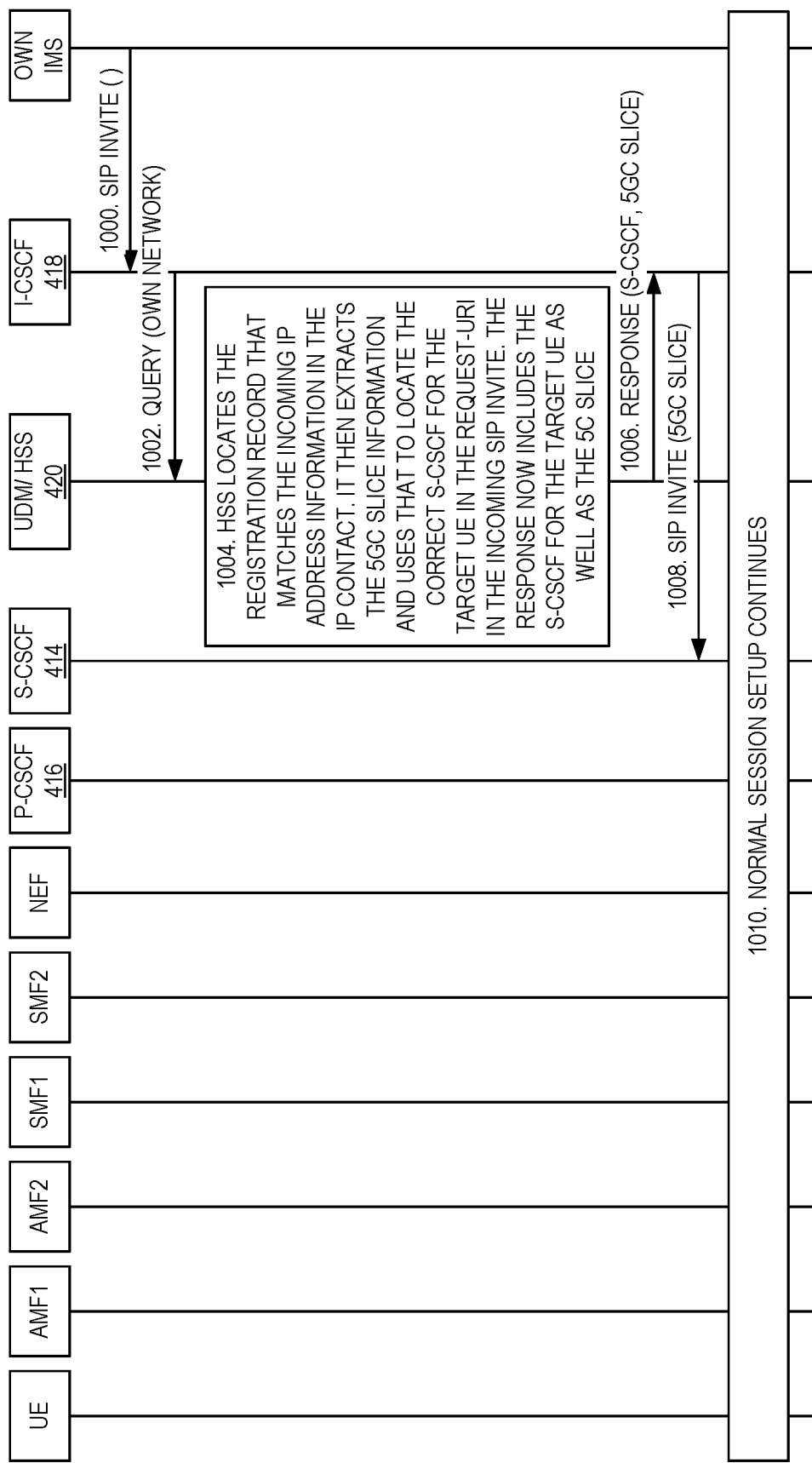
FIG. 10 illustrates a termination session scenario in which the incoming IMS session is an incoming IMS session that originated from the operator's own network and does not include an indication of the used 5GC slice, in accordance with some other embodiments of the present disclosure.

The call flows of FIGS. 8, 9, and 10 detail the routing for incoming sessions using the proper IMS registration information, given that the called target is registered in IMS over two different 5GC slices. The goal as described above is that the I-CSCF 418 selects the proper S-CSCF 414 for the incoming IMS session associated with the correct service. Several terminating session scenarios are described.

Scenario 1 Incoming Session with 5GC Slice Included):

FIG. 8 illustrates a terminating session scenario in which an indication of the 5GC slice is included in the SIP invite message for the incoming IMS session in accordance with some embodiments of the present disclosure.

Step 800: I-CSCF 418 receives a SIP invite message from an external IMS. In this embodiment, the SIP invite message includes an indication of the 5GC slice being used.

Step 802: The I-CSCF 418 queries the HSS 420 using the indication of the 5GC slice being used.

Steps 804 and 806: The HSS 420 locates the record that matches the incoming 5GC slice and returns an indication of the S-CSCF 414 for that record for the target IMPU from the SIP invite message.

Step 808: The I-CSCF 418 then forward the SIP invite message to the indicated S-CSCF 414.

Step 810: Normal session setup continues.

As can be seen in FIG. 8, in Scenario 1, an indication of the 5GC slice used by the UE originating the session is included in the incoming SIP INVITE to the terminating UE/network. This enables the HSS 420 to locate the correct S-CSCF 414 (i.e., the S-CSCF 414 associated with the 5GC slice for the target UE that is registered over the IMS PDU session that matches the 5GC slice for the incoming INVITE). The incoming 5GC slice is carried over to the S-CSCF 414 so the S-CSCF 414 can choose the appropriate P-CSCF 414. The HSS 420 has stored this information at IMS registration, as described above.

Scenario 2 (Incoming Session from an External Network without 5GC Slice):

FIG. 9 illustrates a terminating session scenario in which an indication of the 5GC slice is not included in the SIP invite message for the incoming IMS session in accordance with some embodiments of the present disclosure.

Step 900: I-CSCF 418 receives a SIP invite message from an external IMS. In this embodiment, the SIP invite message does not include an indication of the 5GC slice being used.

Step 902: The I-CSCF 418 queries the HSS 420 using the IMPU from the SIP invite message.

Steps 904 and 906: In this embodiment, the HSS 420 assumes that the 5GC slice being used is a particular 5GC slice (e.g., the eMBB slice). Using this assumption, the HSS 420 locates the record that matches the (assumed) incoming 5GC slice and returns information that indicates the assumed 5GC slice and the S-CSCF 414 for the located record for the target IMPU from the SIP invite message.

Step 908: The I-CSCF 418 then forwards the SIP invite message to the indicated S-CSCF 414. Here, information that indicates the (assumed) 5GC slice is included in the SIP invite message.

Step 910: Normal session setup continues, which can result in a successful or failed outcome.

In this case, the used 5GC by the UE originating the session slice is NOT included in the incoming SIP INVITE from the external network. For this scenario, HSS 420 assumes the 5GC slice to be a particular 5GC slice (e.g., the eMBB slice), the 5GC slice used for regular VoLTE sessions and which this scenario assumes and returns information that indicates the S-CSCF 414 for the target UE 410 that is registered over the IMS PDU session that matches assumed 5GC slice (e.g., the eMBB slice). Information that indicates the assumed 5GC slice (e.g., eMBB slice) is also returned to the I-CSCF 418 in the response. This information is included in the subsequent SIP INVITE to the S-CSCF 414 so it can choose the appropriate P-CSCF 416.

Scenario 3 (Incoming Session from Own Network without 5GC Slice):

FIG. 10 illustrates a termination session scenario in which the incoming IMS session is an incoming IMS session that originated from the operator's own network and does not include an indication of the used 5GC slice, in accordance with some embodiments of the present disclosure.

Step 1000: I-CSCF 418 receives a SIP invite message from the operator's own IMS network. In this embodiment, the SIP invite message does not include an indication of the 5GC slice being used.

Step 1002: The I-CSCF 418 queries the HSS 420 using the IMPU from the SIP invite message.

Steps 1004 and 1006: In this embodiment, the HSS 420 locates the incoming HSS record associated with the IP contact of the incoming INVITE. The HSS 420 then locates the PDU session associated with that contact, determines the 5GC slice used for that PDU session, and returns a response to the I-CSCF 418 that includes information that indicates the determined 5GC slice and the S-CSCF 414 for the determined 5GC slice.

Step 1008: The I-CSCF 418 then forwards the SIP invite message to the indicated S-CSCF 414. Here, information that indicates the 5GC slice is included in the SIP invite message.

Step 1010: Normal session setup continues.

In this case, the incoming session is an incoming session that originated from the operator's own network, and does not include the 5GC slice used by the UE originating the IMS session. For this scenario, HSS locates the incoming HSS record associated with the IP contact of the incoming INVITE. HSS then locates the PDU session associated with that contact (since the operator has both the IMS and 5GC record of the originating subscriber), determines the 5GC slice used for that PDU session, and then proceeds as in scenario 1.

Additional Description

Note that embodiments of the present disclosure may also ensure that the originating SIP INVITE will have the correct 5GC slice used since the 5GC slice inserted by the originating UE can be verified by the P-CSCF 416 if included. If the UE originating the session did not include the indication of the 5GC slice used, the P-CSCF can include it if it has one stored.

Figure 11:
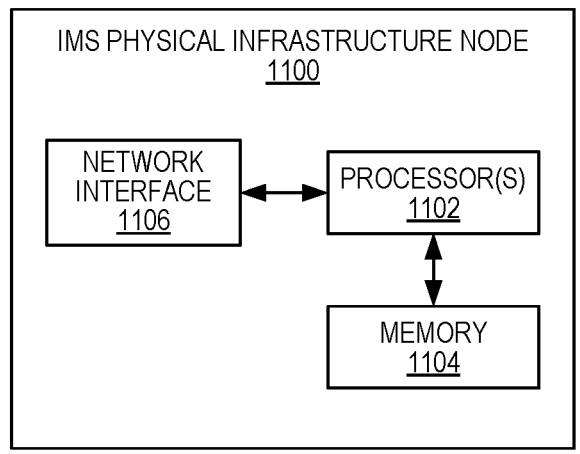
FIGS. 11 and 12 are schematic block diagrams of example embodiments of an IMS physical infrastructure node.

FIG. 11 is a schematic block diagram of an IMS physical infrastructure node 1100. The IMS network slices 412 are logical or virtual networks that are implemented using virtualization technology on a number of IMS physical infrastructure nodes such as the IMS physical infrastructure node 1100. In this regard, the S-CSCFs 414 and, in some embodiments, the P-CSCF(s) 416, the I-CSCF(s) 418, and/or the HSS 420 are implemented as virtual nodes operating on a number of IMS physical infrastructure nodes 1100. Note, however, that some of the IMS nodes (e.g., the P-CSCF(s) 416, the I-CSCF(s) 418, and/or the HSS 420) may alternatively be implemented as physical nodes (i.e., as physical infrastructure nodes).

In this regard, as illustrated in FIG. 11, the IMS physical infrastructure node 1100 includes one or more processors 1102 (e.g., Central Processing Units (CPUs), Application Specific Integrated Circuits (ASICs), Field Programmable Gate Arrays (FPGAs), and/or the like), memory 1104, and a network interface(s) 1106. In some embodiments, using virtualization, the IMS nodes (the S-CSCFs 414 and, in some embodiments, the P-CSCF(s) 416, the I-CSCF(s) 418, and/or the HSS 420) are implemented as virtual nodes that utilize physical resources (e.g., the processor(s) 1102, the memory 1104, and the network interface(s) 1106) of one or more of the IMS physical infrastructure nodes 1100.

In some embodiments, a computer program including instructions which, when executed by at least one processor, causes the at least one processor to carry out the functionality of an IMS node according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
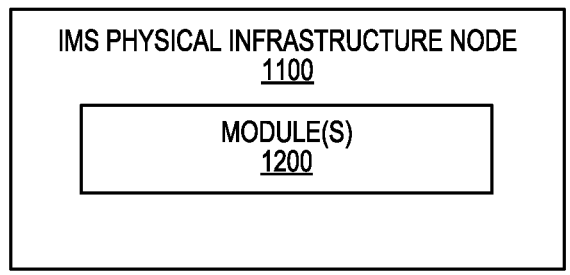

FIG. 12 is a schematic block diagram of the IMS physical infrastructure node 1100 according to some other embodiments of the present disclosure. The IMS physical infrastructure node 1100 includes one or more modules 1200, each of which is implemented in software. The module(s) 1200 provide the functionality of one or more of the IMS nodes described herein.

Figure 13:
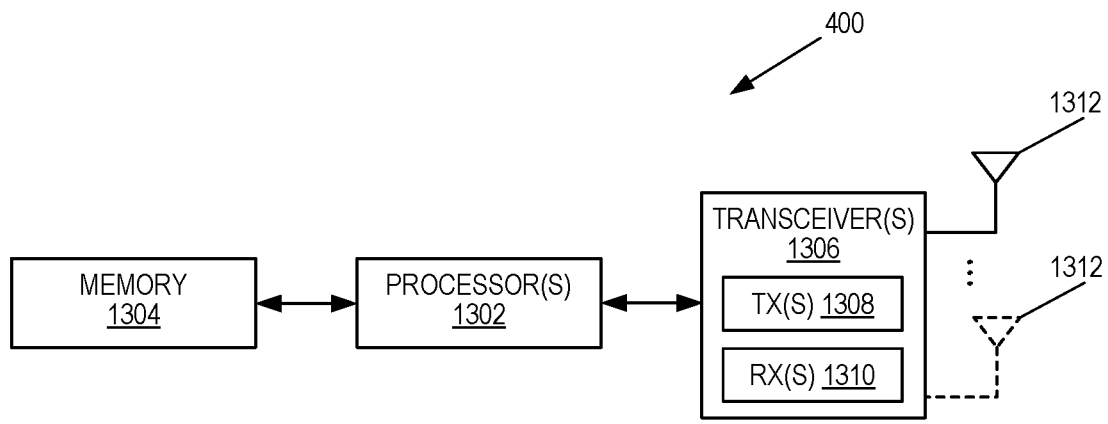
FIGS. 13 and 14 are schematic block diagrams of example embodiments of a User Equipment (UE).

FIG. 13 is a schematic block diagram of the UE 400 according to some embodiments of the present disclosure. As illustrated, the UE 400 includes one or more processors 1302 (e.g., CPUs, ASICs, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by on of ordinary skill in the art. The processors 1302 are also referred to herein as processing circuitry. The transceivers 1306 are also referred to herein as radio circuitry. In some embodiments, the functionality of the UE 400 described above may be fully or partially implemented in software that is, e.g., stored in the memory 1304 and executed by the processor(s) 1302. Note that the UE 400 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the UE 400 and/or allowing output of information from the UE 400), a power supply (e.g., a battery and associated power circuitry), etc.

In some embodiments, a computer program including instructions which, when executed by at least one processor, causes the at least one processor to carry out the functionality of the UE 400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
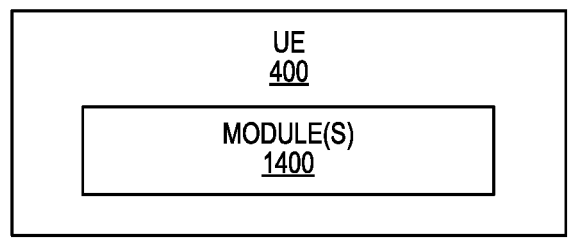

FIG. 14 is a schematic block diagram of the UE 400 according to some other embodiments of the present disclosure. The UE 400 includes one or more modules 1400, each of which is implemented in software. The module(s) 1400 provide the functionality of the UE 400 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method comprising:
  at an I-CSCF:
    receiving (500; 600) a SIP INVITE message for an incoming session, the SIP INVITE message comprising an IMPU of a target UE;
    sending (502; 602), to an HSS, a query for S-CSCFs having registrations for the IMPU of the target UE;
    receiving (506; 606), from the HSS, information that indicates two or more S-CSCFs having registrations for the IMPU of the target UE;
    forwarding (510 or 520; 610a-610b) the SIP INVITE message to at least one of the two or more S-CSCFs;
  at the HSS:
    receiving (502; 602) the query from the I-CSCF;
    obtaining (504; 604) the information that indicates the two or more S-CSCFs having registrations for the IMPU of the target UE; and
    sending (506; 606), to the I-CSCF, the information that indicates the two or more S-CSCFs having registrations for the IMPU of the target UE; and
  at each S-CSCF of the at least one of the two or more S-CSCFs:
    determining (512 or 522; 612a or 612b) whether to accept the incoming session based on the SIP INVITE message;
    if determined to reject the incoming session, sending (514; 614a) a message to the I-CSCF that indicates an error or rejection; and
    if determined to accept the incoming session, forwarding (524; 614b) the SIP invite to another node.

Embodiment 2: The method of embodiment 1 further comprising, at the I-CSCF, selecting (508) (e.g., any one of the two or more S-CSCFs as) a first S-CSCF, wherein forwarding (510 or 520; 610a-610b) the SIP INVITE message to the at least one of the two or more S-CSCFs comprises forwarding (510) the SIP INVITE message to the first S-CSCF.

Embodiment 3: The method of embodiment 2 further comprising, at the I-CSCF: receiving (514) a message from the first S-CSCF that indicates an error or rejection of the incoming session; and upon receiving (514) a message from the first S-CSCF that indicates an error or rejection of the incoming session, selecting (518) (e.g., any other one of the two or more S-CSCFs as) a second S-CSCF and forwarding (520) the SIP INVITE message to the second S-CSCF.

Embodiment 4: The method of embodiment 1 wherein forwarding (510; 610a-610b) the SIP INVITE message to the at least one of the two or more S-CSCFs comprises forwarding (610a-610b) the SIP INVITE message to each of the two or more S-CSCFs.

Embodiment 5: The method of any one of embodiments 1 to 4 wherein, at each S-CSCF of the at least one of the two or more S-CSCFs, determining (512 or 522; 612a or 612b) whether to accept the incoming session based on the SIP INVITE message comprises determining whether there is a match between a requested service of the SIP INVITE message and UE contact of the target UE.

Embodiment 6: A method performed by I-CSCF, the method comprising: receiving (500; 600) a SIP INVITE message for an incoming session, the SIP INVITE message comprising an IMPU of a target UE; obtaining (502-506; 602-606), based on the IMPU, information that indicates two or more S-CSCFs having registrations for the IMPU of the target UE; forwarding (510; 610a-610b) the SIP INVITE message to at least one of the two or more S-CSCFs.

Embodiment 7: The method of embodiment 6 further comprising selecting (508) (e.g., any one of the two or more S-CSCFs as) a first S-CSCF, wherein forwarding (510; 610a-610b) the SIP INVITE message to the at least one of the two or more S-CSCFs comprises forwarding (510) the SIP INVITE message to the first S-CSCF.

Embodiment 8: The method of embodiment 7 further comprising receiving (514) a message from the first S-CSCF that indicates an error or rejection of the incoming session and, upon receiving (514) a message from the first S-CSCF that indicates an error or rejection of the incoming session, selecting (518) (e.g., any other one of the two or more S-CSCFs as) a second S-CSCF and forwarding (520) the SIP INVITE message to the second S-CSCF.

Embodiment 9: The method of embodiment 6 wherein forwarding (510; 610*a*-610*b*) the SIP INVITE message to the at least one of the two or more S-CSCFs comprises forwarding (610*a*-610*b*) the SIP INVITE message to each of the two or more S-CSCFs.

Embodiment 10: An Internet Protocol Multimedia Subsystem, IMS, node adapted to perform the method of any one of embodiments 6 to 9.

Embodiment 11: An Internet Protocol Multimedia Subsystem, IMS, physical infrastructure node (1100) on which an IMS node is operating, the IMS node adapted to perform the method of any one of embodiments 6 to 9.

Embodiment 12: A system comprising:
an I-CSCF adapted to:
  receive (500; 600) a SIP INVITE message for an incoming session, the SIP INVITE message comprising an IMPU of a target UE;
  send (502; 602), to an HSS, a query for S-CSCFs having registrations for the IMPU of the target UE;
  receive (506; 606), from the HSS, information that indicates two or more S-CSCFs having registrations for the IMPU of the target UE;
  forward (510 or 520; 610*a*-610*b*) the SIP INVITE message to at least one of the two or more S-CSCFs;
the HSS, wherein the HSS is adapted to:
  receive (502; 602) the query from the I-CSCF;
  obtain (504; 604) the information that indicates the two or more S-CSCFs having registrations for the IMPU of the target UE; and
  send (506; 606), to the I-CSCF, the information that indicates the two or more S-CSCFs having registrations for the IMPU of the target UE; and
the two or more S-CSCFs, wherein each S-CSCF of the at least one of the two or more S-CSCFs is adapted to:
  determine (512 or 522; 612*a* or 612*b*) whether to accept the incoming session based on the SIP INVITE message;
  if determined to reject the incoming session, send (514; 614*a*) a message to the I-CSCF that indicates an error or rejection; and
  if determined to accept the incoming session, forward (524; 614*b*) the SIP invite to another node.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SDP Session Description Protocol.
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method comprising:
at an Interrogating Call Session Control Function, I-CSCF:
  receiving a Session Initiation Protocol, SIP, invite message for an incoming session, the SIP invite message comprising an Internet Protocol, IP, Multimedia Public Identity, IMPU, of a target User Equipment, UE;
  sending, to a Home Subscriber Server, HSS, a query for Serving Call Session Control Functions, S-CSCFs, having registrations for the IMPU of the target UE;
  receiving, from the HSS, information that indicates two or more S-CSCFs having registrations for the IMPU of the target UE; and
  forwarding the SIP invite message to at least one of the two or more S-CSCFs, comprising forwarding the SIP invite message to each of the two or more S-CSCFs;
at the HSS:
  receiving the query from the I-CSCF;
  obtaining the information that indicates the two or more S-CSCFs having registrations for the IMPU of the target UE; and
  sending, to the I-CSCF, the information that indicates the two or more S-CSCFs having registrations for the IMPU of the target UE; and
at each S-CSCF of the at least one of the two or more S-CSCFs:
  receiving the SIP invite message from the I-CSCF;
  determining whether to accept the incoming session based on the SIP invite message, comprising determining whether there is a match between a requested service of the SIP invite message and contact information for the target UE, the contact information for the target UE comprising information that indicates a plurality of services that the target UE supports obtained during IP Multimedia Subsystem, IMS, registration of the target UE with an IMS slice associated to the S-CSCF, wherein the contact information for the target UE comprises feature tags that indicate the plurality of services that the target UE supports;

if determined to reject the incoming session, sending a message to the I-CSCF that indicates an error or rejection; and if determined to accept the incoming session, forwarding the SIP invite message to another node.

2. The method of claim 1 further comprising, at the I-CSCF:

selecting a first S-CSCF from among the two or more S-CSCFs;

wherein forwarding the SIP invite message to the at least one of the two or more S-CSCFs comprises forwarding the SIP invite message to the first S-CSCF.

3. The method of claim 2 further comprising, at the I-CSCF:

receiving a message from the first S-CSCF that indicates an error or rejection of the incoming session; and upon receiving the message from the first S-CSCF that indicates an error or rejection of the incoming session:
selecting a second S-CSCF from among the two or more S-CSCFs; and
forwarding the SIP invite message to the second S-CSCF.

4. The method of claim 1 wherein the target UE has two or more IMS registrations over two or more IMS Protocol Data Unit, PDU, sessions established using different core network slices using a same IP Multimedia Private Identity, IMPI, and IMPU, and each of the two or more IMS registrations is associated to one of the two or more S-CSCFs.

5. The method of claim 1, wherein the forwarding the SIP invite message to each of the two or more S-CSCFs is performed in parallel.

* * * * *